United States Patent
Kawagishi et al.

(10) Patent No.: US 8,111,269 B2
(45) Date of Patent: Feb. 7, 2012

(54) PLANT INFORMATION DISPLAY DEVICE

(75) Inventors: Motohiko Kawagishi, Tokyo (JP); Yohei Ueno, Tokyo (JP); Tadashi Ohi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 615 days.

(21) Appl. No.: 12/251,721

(22) Filed: Oct. 15, 2008

(65) Prior Publication Data

US 2009/0262144 A1   Oct. 22, 2009

(30) Foreign Application Priority Data

Apr. 16, 2008   (JP) ................................. 2008-106688

(51) Int. Cl.
*G09G 5/00* (2006.01)

(52) U.S. Cl. ........ 345/661; 345/418; 345/660; 382/276; 382/298; 382/300

(58) Field of Classification Search .................. None
See application file for complete search history.

(56) References Cited

FOREIGN PATENT DOCUMENTS

| JP | 3-194590    | 8/1991 |
|----|-------------|--------|
| JP | 7-200695    | 8/1995 |
| JP | 8-83388     | 3/1996 |
| JP | 2555412     | 9/1996 |
| JP | 9-152908    | 6/1997 |
| JP | 10-78819    | 3/1998 |
| JP | 11-7316     | 1/1999 |
| JP | 11-73292    | 3/1999 |
| JP | 2002-163017 | 6/2002 |
| JP | 3442238     | 6/2003 |
| JP | 2005-55965  | 3/2005 |
| JP | 2006-72408  | 3/2006 |

OTHER PUBLICATIONS

U.S. Appl. No. 13/160,938, filed Jun. 15, 2011, Ueno, et al.
Office Action issued Aug. 17, 2010, in Japan Patent Application No. 2008-106688 (with English-language translation.

*Primary Examiner* — Kee M Tung
*Assistant Examiner* — Michelle Chin
(74) *Attorney, Agent, or Firm* — Oblon, Spivak, McClelland, Maier & Neustadt, L.L.P.

(57) ABSTRACT

An object of the invention is to provide a plant information display device which deforms and displays drawing data without hiding all pieces of information necessary for plant monitoring and plant instrument operation while visibility is not lowered. The plant information display device according to an aspect of the invention includes an input unit; a region determination unit into which an interest region and a deformation condition in a plant are fed using the input unit, the region determination unit specifying a deformation target region based on the interest region and deformation condition supplied from the input unit; a region division unit which divides a drawing into plural regions based on the deformation target region specified by the region determination unit, the region division unit performing management while the deformation target region and a non-deformation target region are divided; a drawing distortion unit which separately deforms the deformation target region and non-deformation target region in a display region; a drawing output unit; and a display unit.

10 Claims, 19 Drawing Sheets

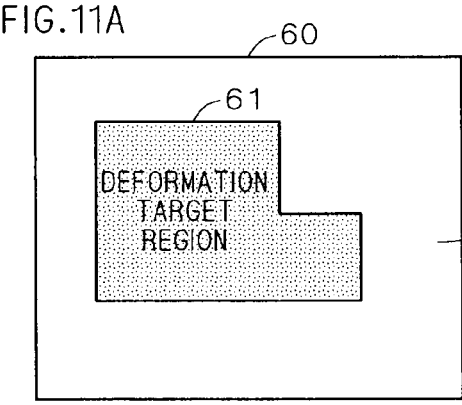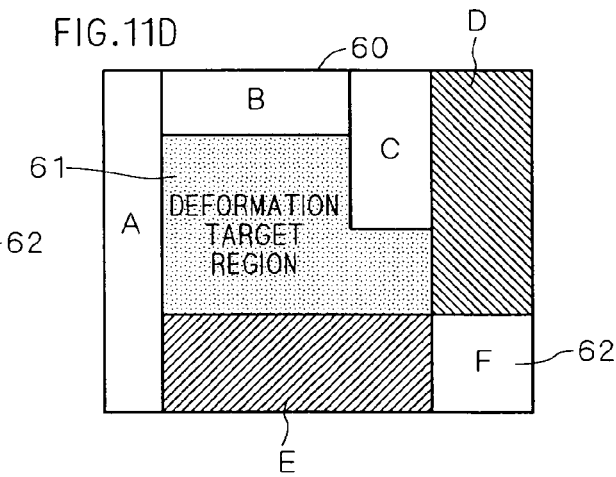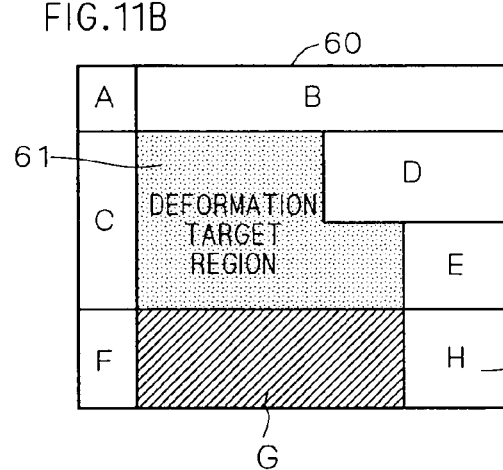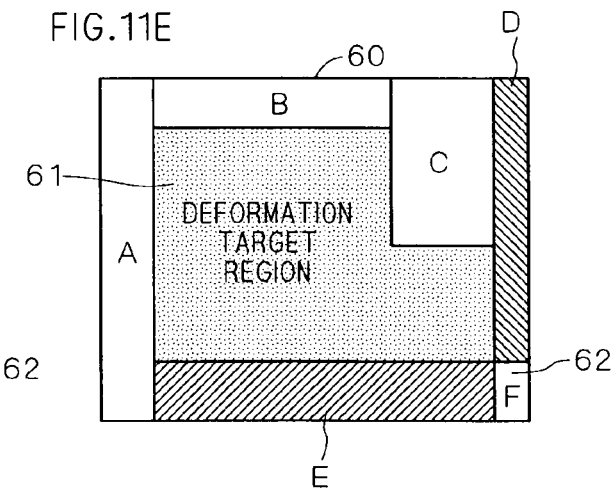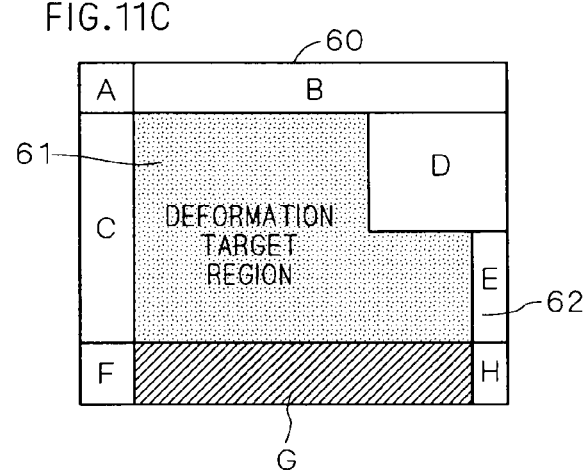

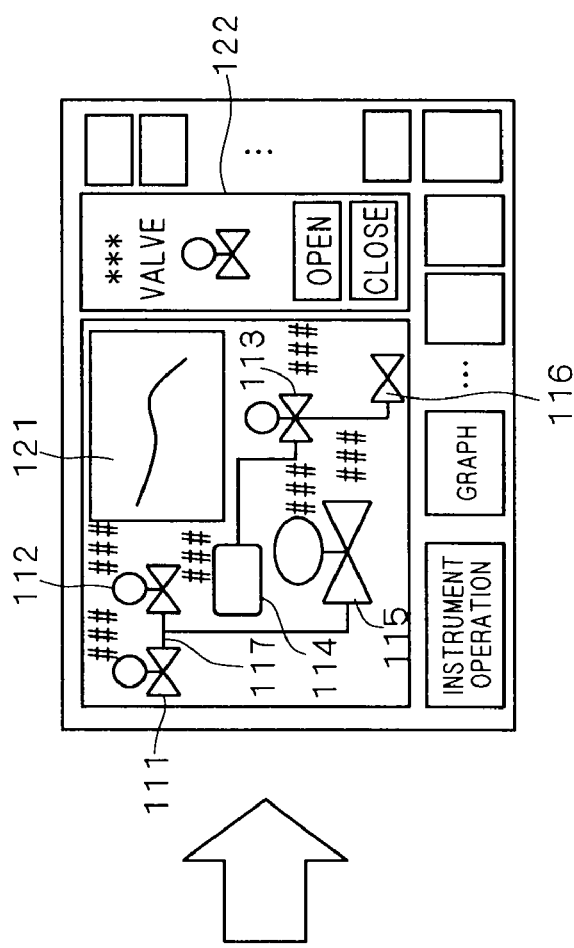
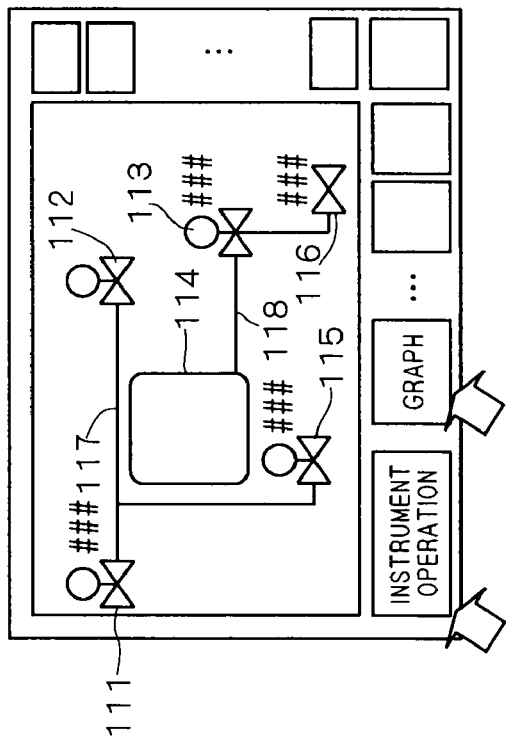

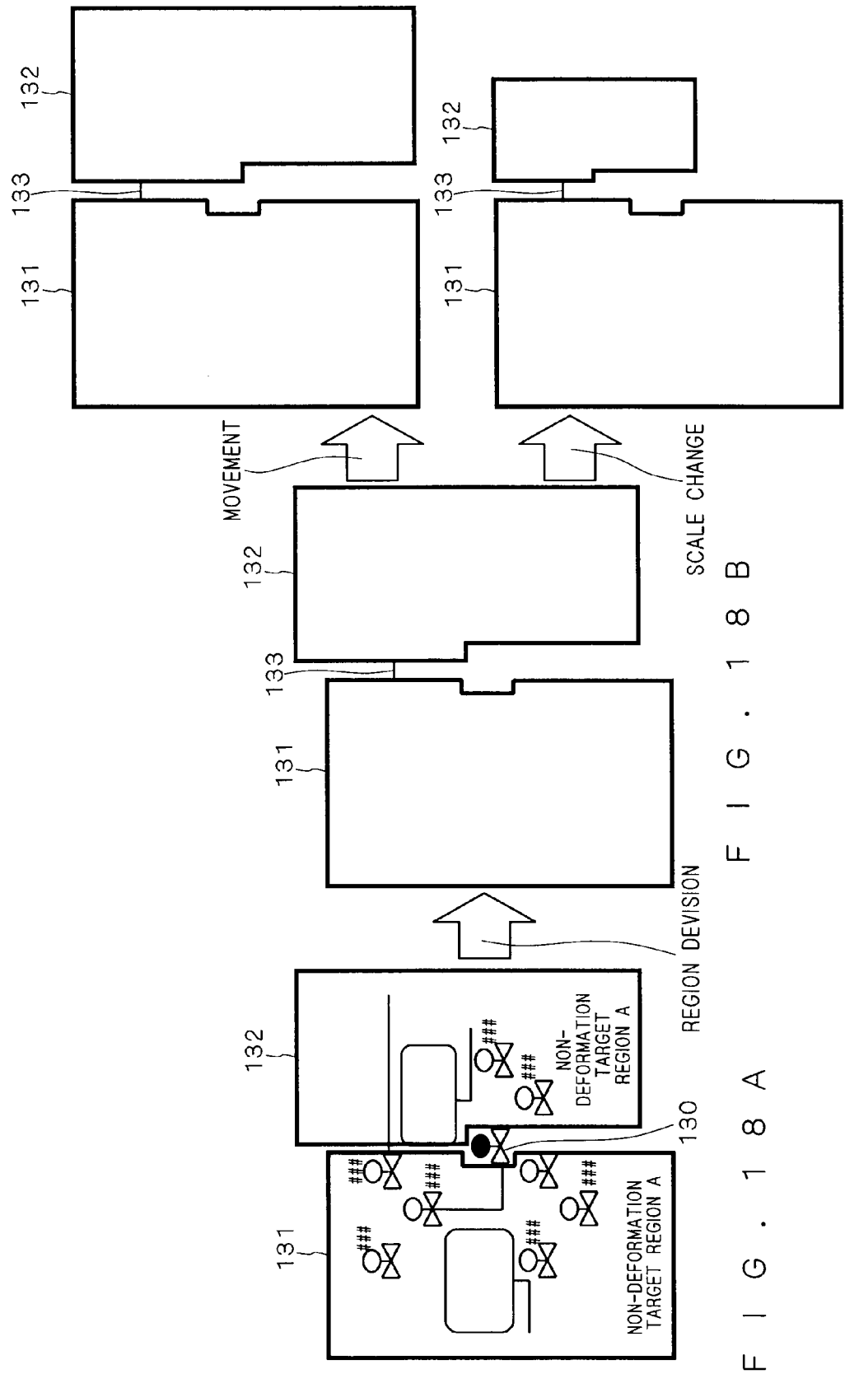

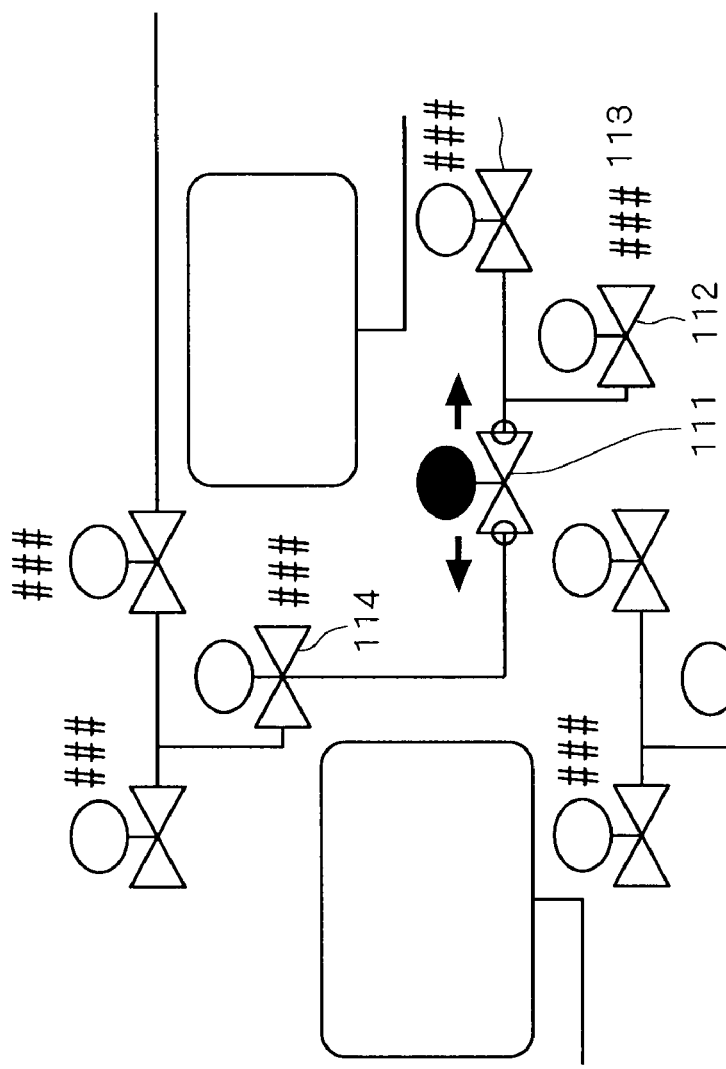
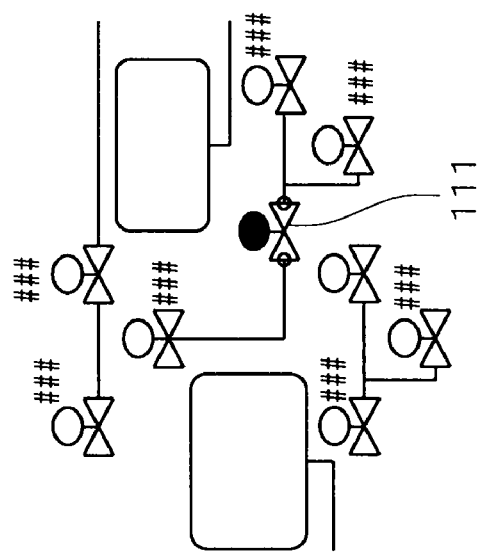
FIG. 19B
FIG. 19A

PLANT INFORMATION DISPLAY DEVICE

BACKGROUND OF THE INVENTION

1. Field of the Invention

The present invention relates to a plant information display device, particularly to a plant information display device which recognizes a plant state to display plant information necessary to operate instruments constituting a plant.

2. Description of the Related Art

Conventionally, a plant information display device which recognizes an operating plant state to display plant information necessary to operate instruments constituting a plant is provided in a plant system such as a nuclear power generation plant, a thermal power generation plant, and a water-treatment plant. In a plant information display device disclosed in Japanese Patent No. 2555412, when an instrument operation screen is displayed on a screen in which instrument system information is displayed, the screen in which instrument system information is displayed is reduced based on a screen size, and the instrument operation screen is displayed without hiding the instrument system information so as not to overlap the screen in which instrument system information is displayed.

There is also map data similar to the plant instrument system information. Japanese Patent No. 3442238 discloses a deformation map producing device which displays a line drawing of the deformed map data. According to the description of Japanese Patent No. 3442238, a length of a pattern element expressing a road is changed within a mad drawing region specified to the map data by a user, a road which is not correlated with a target is removed, and an angle at which plural pattern elements expressing the roads intersect one another is changed.

However, in the plant information display device disclosed in Japanese Patent No. 2555412, because system information is reduced when the instrument operation screen is displayed, unfortunately visibility is deteriorated for information on a macro connection relationship of an operation target instrument or important information on instrument operation such as a range influenced by the instrument operation. Additionally, in the plant information display device disclosed in Japanese Patent No. 2555412, because the screen including the system information is reduced, unfortunately the currently-gazing region or instrument is hardly recognized in the screen.

On the other hand, in the deformation map producing device disclosed in Japanese Patent No. 3442238, work on correlation between road information included in the map data and target information is required, and the pattern element expressing the road which is not correlated with the target is removed during the deformation. However, in the plant such as the nuclear power generation plant, the thermal power generation plant, and the water-treatment plant, sometimes an operation performed to a specific instrument has an influence on an instrument drawn in a region which is not close to the specific instrument in the screen or on the entire system, the partial removal of the system information becomes troublesome from the viewpoint of a degree of operation or appropriateness of the operation. Additionally, in the deformation map producing device disclosed in Japanese Patent No. 3442238, the user expressly specifies a drawing region of the map, thereby deforming only a part of the map. Therefore, considerable computation is required for the drawing in deforming the entire plant or the whole of a specific system (for example, a steam generation system and cooling water system) in the plant, which results in a problem from the viewpoint of instantaneousness.

SUMMARY OF THE INVENTION

An object of the invention is to provide a plant information display device which deforms and displays drawing data without hiding all the pieces of information necessary for plant monitoring and plant instrument operation while visibility is not lowered.

In accordance with one embodiment of the invention, a plant information display device which recognizes a plant state to display plant information necessary to operate instruments constituting the plant, the plant information display device includes an input unit; a region determination unit into which an interest region and a deformation condition in the plant are fed using the input unit, the region determination unit specifying a deformation target region based on the interest region and the deformation condition supplied from the input unit; a region division unit which divides a drawing into plural regions based on the deformation target region specified by the region determination unit, the region division unit performing management while the deformation target region and a non-deformation target region are divided; a drawing distortion unit which separately deforms the deformation target region and the non-deformation target region in a display region; a drawing output unit which supplies the deformation target region and the non-deformation target region as output data of the drawing, the deformation target region and the non-deformation target region being distorted by the drawing distortion unit; and a display unit which displays the output data supplied from the drawing output unit.

In the plant information display device according to one embodiment of the invention, the deformation target region deformed by the drawing distortion unit and the non-deformation target region distorted by the drawing distortion unit are disposed based on a topological relationship among the instruments shown in the drawing, and the non-connection point is reconstructed as the drawing by performing interpolation connection of the pattern elements on the basis of logical connection information of topological information. Therefore, even if the display region is restricted, the drawing data can be deformed and displayed without hiding all the pieces of information necessary for the plant monitoring and plant instrument operation while the visibility is not lowered.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 11A to 11E are views for explaining non-highlighted data generation of a plant information display device according to an eleventh embodiment of the invention;

FIGS. 16A and 16B are views for explaining interpolation of a plant information display device according to a sixteenth embodiment of the invention;

FIGS. 18A to 18C are views for explaining interpolation of a plant information display device according to an eighteenth embodiment of the invention; and FIGS. 19A and 19B are views for explaining interpolation of a plant information display device according to a nineteenth embodiment of the invention.

DESCRIPTION OF THE PREFERRED EMBODIMENTS

First Embodiment

Figure 1:
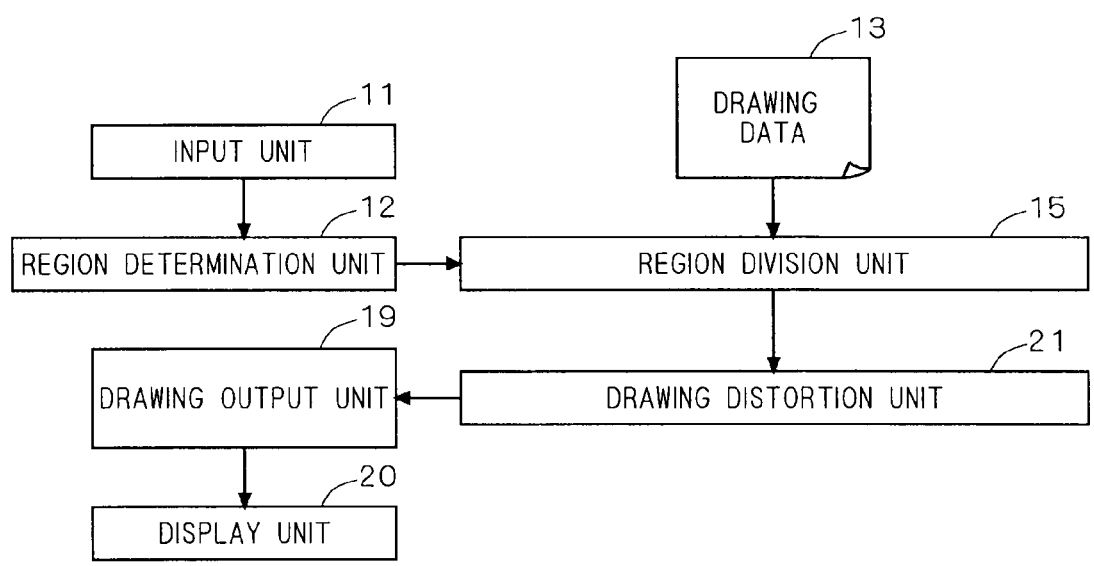
FIG. 1 is a block diagram showing a plant information display device according to a first embodiment of the invention.

FIG. 1 shows a block diagram of a plant information display device according to a first embodiment of the invention. Referring to FIG. 1, the plant information display device includes an input unit 11 such as a mouse, a keyboard, and a touch panel and a region determination unit 12. An interest region including an instrument and a deformation condition of the interest region are fed into the region determination unit 12, and the region determination unit 12 specifies a deformation target region on the basis of the interest region and deformation condition which are supplied from the input unit. The plant information display device of FIG. 1 also includes a region division unit 15, a drawing distortion unit 21, a drawing output unit 19, and a display unit 20.

The region division unit 15 divides the whole of drawing data 13 into two kinds of regions, that is, the deformation target region and a non-deformation target region on the basis of the data concerning the deformation target region specified by the region determination unit 12. As used herein, information on logical connection between the instruments which is of topological information shall mean a connection relationship between symbols expressing the instruments on the drawing data 13 or connection relationship between the symbol expressing the instrument and a line segment expressing piping connected to the symbol or a polygonal line. For the single symbol or plural symbols, deformation shall mean enlargement and color change of the symbol, a change of a line thickness of a pattern element constituting the symbol, a change of type of the line, a symbol display region highlighted by hatching.

The deformation target region shall mean a closed region including the (single or plural) symbol which becomes deformation target. The non-deformation target region shall mean a region in which the deformation target region is removed from the whole of the drawing data 13. The non-deformation target region is expressed as the single region or plural different regions according to the position of the deformation target region.

The drawing distortion unit 21 has a deformation function of highlighting the deformation target region and a non-highlighted data generation function of distorting the non-deformation target region. The drawing distortion unit 21 takes out the drawing data 13 from the deformation target region specified by the region division unit 15, and the drawing distortion unit 21 performs the deformation to the drawing data 13 according to a deformation condition. In order to achieve matching with the deformed drawing data 13 of the deformation target region, the drawing distortion unit 21 changes a scale of the drawing data 13 included in the non-deformation target region determined by the region division unit 15, or the drawing distortion unit 21 abstracts the region.

The drawing distortion unit 21 arranges plural pieces of drawing data 13, processed by the deformation function and non-highlighted data generation function included in the drawing distortion unit 21, based on the instrument topological relationship described in the drawing data 13, and the drawing distortion unit 21 reconstructs the plural pieces of drawing data 13 into one drawing. In the case where the pieces of drawing data 13 adjacent to each other are not correctly connected due to deformation contents or scale during the displacement of the pieces of drawing data 13, the drawing distortion unit 21 performs interpolation of the pattern element necessary for the connection to the point (non-connection point) on the basis of the logical connection information of the topological information. The drawing distortion unit 21 performs scale adjustment processing for matching connection points with each other if needed.

The drawing output unit 19 supplies the drawing reconstructed by the drawing distortion unit 21 to the display unit 20 in the form of output data. The display unit 20 displays the output data supplied from the drawing output unit 19. The output data supplied from the drawing output unit 19 may be supplied in the form of a file without supplying the output data to the display unit 20. In the components except of FIG. 1 for the input unit 11 and the output unit 20, an operation of the component may be programmed and mounted on a computer.

Thus, the plant information display device of the first embodiment includes the components of FIG. 1, so that the deformation display can be performed without changing the topology between the instruments in the drawing, and the instrument on which attention is focused in the instrument operation can easily be recognized to achieve laborsaving of plant running work.

Second Embodiment

Figure 2A:
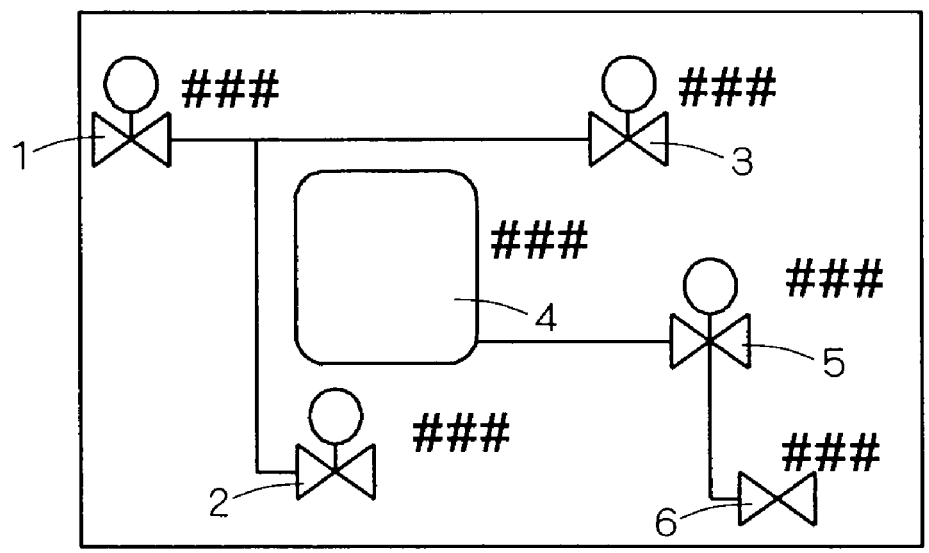
FIGS. 2A and 2B are views for explaining a deformation condition of a plant information display device according to a second embodiment of the invention.
Figure 2B:
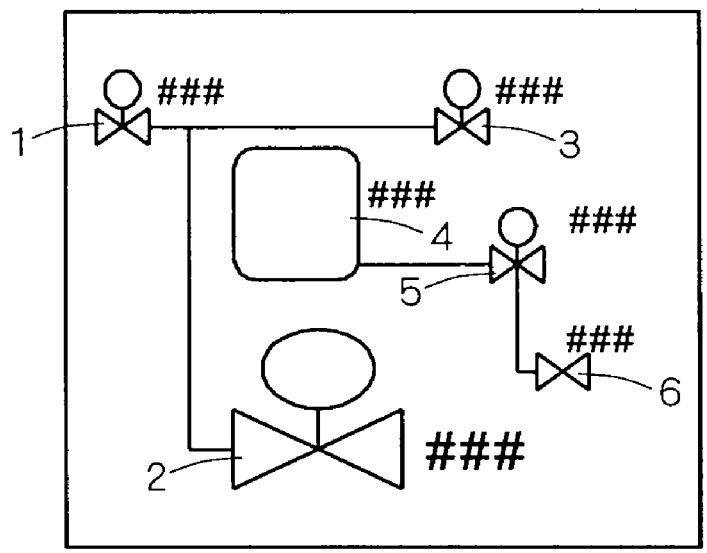

FIGS. 2A and 2B show schematic views of deformation processing performed by a plant information display device according to a second embodiment of the invention. The deformation processing shown in FIGS. 2A and 2B is performed based on a deformation condition supplied from the region determination unit 12. Under the deformation condition, the deformation display of only the target operation instrument is performed in a situation in which the instrument operation is required.

FIG. 2A shows two systems, that is, instruments 2 and 3 which are connected in parallel to the instrument 1 and instruments 5 and 6 which are connected in series to the instrument 4. When the instrument 2 is specified as the operation instrument (interest region) using the input unit 11, the deformation display of only the instrument 2 is performed as shown in FIG. 2B in the plant information display device of the second embodiment. Although the enlargement display is used as the deformation display in the second embodiment, the invention is not limited to the enlargement display. For example, a display color of the target instrument may be changed. In addition to the enlargement display of the target instrument, the display color may simultaneously be changed in order to further highlight the deformed target instrument.

On the other hand, as shown in FIG. 2B, because the regions except for the instrument 2 are the non-deformation region, the regions except for the instrument 2 are changed by the non-highlighted data generation function of the drawing distortion unit 21 such that the scale of the regions except for the instrument 2 is reduced compared with the scale of FIG. 2A. That is, the scale of the non-deformation region is adjusted, because adjustment such as securement of a display space is required with the enlargement of the instrument 2 which is of the deformation region.

Thus, in the deformation condition of the second embodiment, because the deformation display of only the operation target instrument in the drawing can be performed, advantageously a sight line can be induced to an area on which attention is focused during the instrument operation. Additionally, not only a possibility of mistakenly recognizing the operation target instrument is reduced by the deformation display, but also the instrument operation is properly performed without mistakenly recognizing instrument parameters such as valve opening while the instrument parameters are confirmed.

Third Embodiment

Figure 3A:
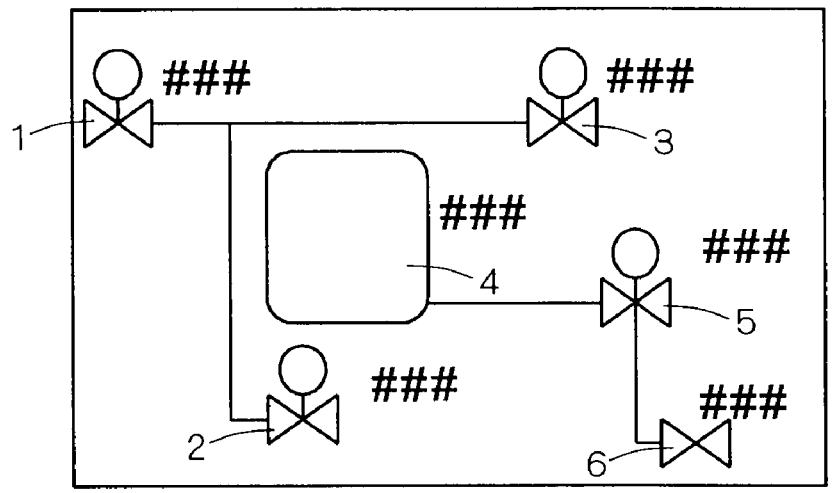
FIGS. 3A and 3B are views for explaining a deformation condition of a plant information display device according to a third embodiment of the invention.
Figure 3B:
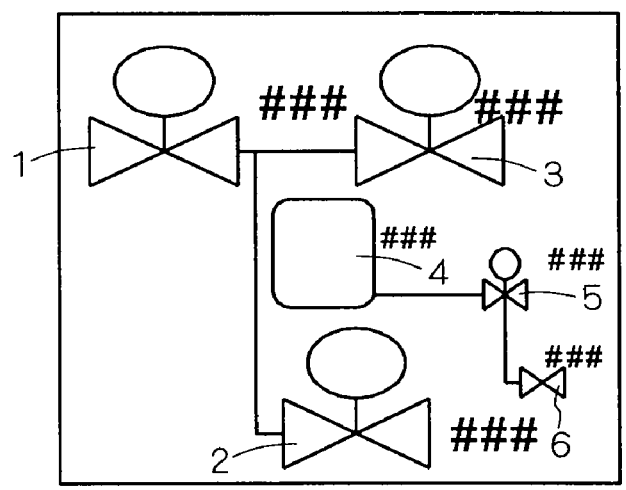

FIGS. 3A and 3B show schematic views of deformation processing performed by a plant information display device according to a third embodiment of the invention. In the deformation processing shown in FIGS. 3A and 3B, the deformation display is performed in a range influenced by the instrument operation in the situation in which the instrument operation is required. An example of the case influenced by the instrument operation includes the case in which an instrument and another instrument connected to the instrument through the piping are influenced by changing an instrument state such as the valve opening. The range influenced by the instrument operation can also be set to a range of an instrument (hereinafter also referred to as primary connection instrument) directly connected to the operation target instrument using the information on the logical connection between the instruments.

FIG. 3A shows the two systems, that is, the instruments 2 and 3 which are connected in parallel to the instrument 1 and the instruments 5 and 6 which are connected in series to the instrument 4. The instrument 2 is specified as the operation instrument (interest region) using the input unit 11. At this point, because the range influence by the operation of the instrument 2 covers the instruments 1 and 3 connected through the piping, the deformation display of the instruments 1, 2, and 3 (primary connection instrument) is performed while the instruments 1, 2, and 3 are enlarged as shown in FIG. 3B. Although the enlargement display is used as the deformation display in the third embodiment, the invention is not limited to the enlargement display. For example, the display color of the target instrument may be changed. In addition to the enlargement display of the target instrument, the display color may simultaneously be changed in order to further highlight the deformed target instrument.

On the other hand, as shown in FIG. 3B, because the regions except for the primary connection instrument are the non-deformation region, the regions except for the primary connection instrument are changed by the non-highlighted data generation function of the drawing distortion unit 21 such that the scale of the regions except for the primary connection instrument is reduced compared with the scale of FIG. 3A. That is, the scale of the non-deformation region is adjusted, because adjustment such as the securement of the display space is required with the enlargement of the primary connection instrument which is of the deformation region.

Thus, in the deformation condition of the third embodiment, because the deformation display of only the range influenced by the instrument operation in the drawing can be performed, advantageously the sight line can be induced to the area on which attention is focused during the instrument operation. Additionally, compared with the second embodiment, the influence of the instrument operation is easily recognized in a wider range.

Fourth Embodiment

Figure 4A:
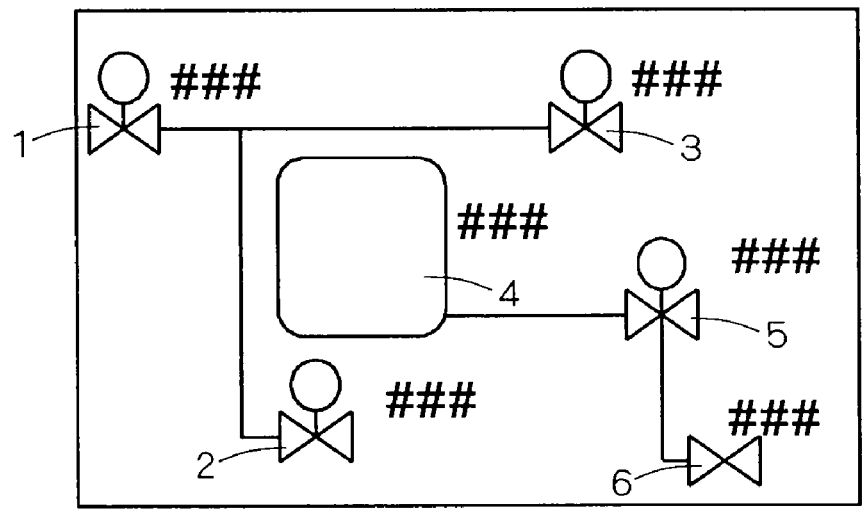
FIGS. 4A and 4B are views for explaining a deformation condition of a plant information display device according to a fourth embodiment of the invention.
Figure 4B:
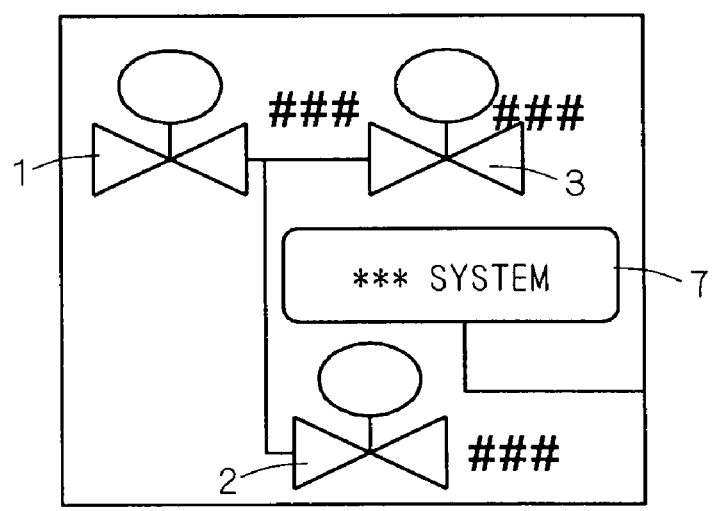

FIGS. 4A and 4B show schematic views of deformation processing performed by a plant information display device according to a fourth embodiment of the invention. In the deformation processing shown in FIGS. 4A and 4B, the deformation display is performed in the range influenced by the instrument operation, while the range which is not influenced by the instrument operation or the range on which the instrument operation has a little influence is abstracted.

FIG. 4A shows two systems, that is, the instruments 2 and 3 which are connected in parallel to the instrument 1 and the instruments 5 and 6 which are connected in series to the instrument 4. The instrument 2 is specified as the operation instrument (interest region) using the input unit 11. At this point, because the range influence by the operation of the instrument 2 covers the instruments 1 and 3 connected through the piping, the deformation display of the instruments 1, 2, and 3 (primary connection instrument) is performed while the instruments 1, 2, and 3 are enlarged as shown in FIG. 4B. Although the enlargement display is used as the deformation display in the fourth embodiment, the invention is not limited to the enlargement display. For example, the display color of the target instrument may be changed. In addition to the enlargement display of the target instrument, the display color may simultaneously be changed in order to further highlight the deformed target instrument.

On the other hand, as shown in FIG. 4B, because the regions (the range which is not influenced by the operation instrument or the range on which the operation instrument has a little influence) except for the primary connection instrument are the non-deformation region, the instruments 4, 5, and 6 are contracted and abstracted into a box 7 by the drawing distortion unit 21. The meanings of the box 7 can be recognized using a name or a mark which expresses the system as shown in FIG. 4B. The monochrome display of the box 7 may be performed in order to further highlight the deformation target.

Thus, by using processing in drawing distortion unit 21 of the fourth embodiment, because the range which is not influenced by the instrument operation in the drawing or the range on which the instrument operation has a little influence can be contracted and abstracted as shown by the box 7 of FIG. 4B, the information, such as the region on which attention is focused during the instrument operation, which is necessary for an instrument operator can be displayed easily and expressly to improve the visibility.

Fifth Embodiment

Figure 5A:
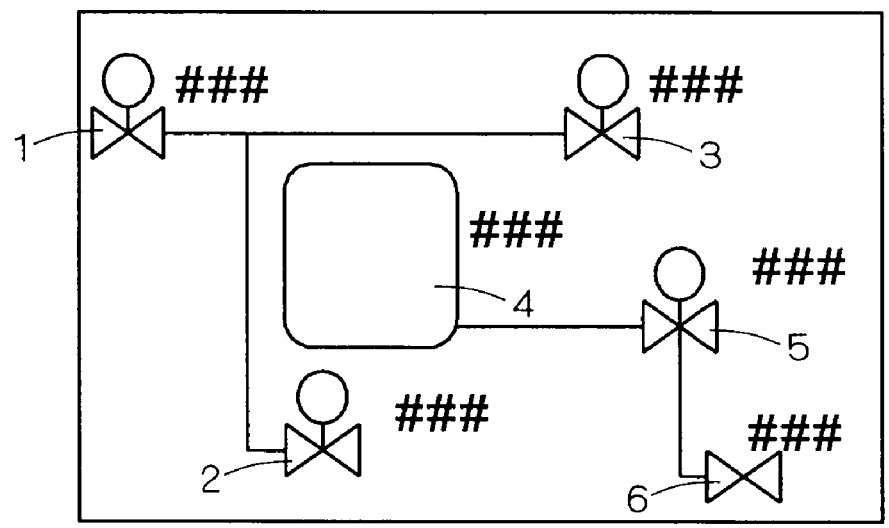
FIGS. 5A and 5B are views for explaining a deformation condition of a plant information display device according to a fifth embodiment of the invention.
Figure 5B:
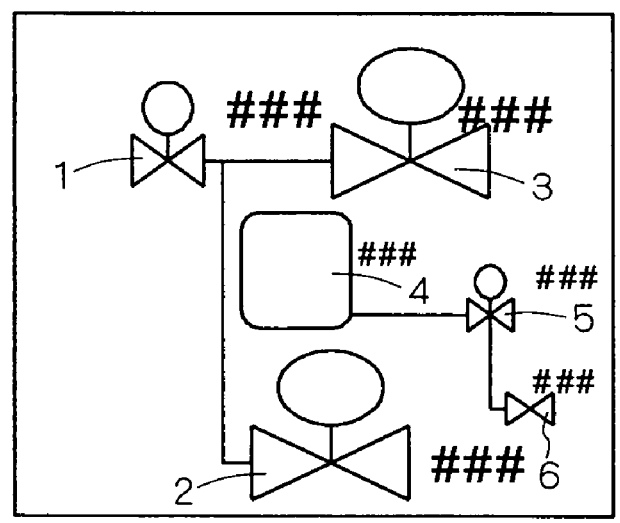

FIGS. 5A and 5B show schematic views of deformation processing performed by a plant information display device according to a fifth embodiment of the invention. In the deformation processing shown in FIGS. 5A and 5B, the deformation display is performed to not only the operation target instrument but also an instrument (hereinafter also referred to as continuous operation instrument) having a high possibility of necessity of operation after the instrument operation in the situation in which the instrument operation is required. The region determination unit 12 makes a determination of the continuous operation instrument on the basis of past running record data, a plant state, and a running procedure manual of an event similar to the current plant state.

FIG. 5A shows two systems, that is, the instruments 2 and 3 which are connected in parallel to the instrument 1 and the instruments 5 and 6 which are connected in series to the instrument 4. The instrument 2 is specified as the operation instrument (interest region) using the input unit 11. At this point, because the region determination unit 12 determines that the instrument 3 has the instrument (continuous operation instrument) having the high possibility of necessity of operation after operation of the instrument 2, the deformation display of the instruments 1 and 3 is performed while the instruments 1 and 3 are enlarged as shown in FIG. 5B. Although the enlargement display is used as the deformation display in the fifth embodiment, the invention is not limited to the enlargement display. For example, the display color of the target instrument may be changed. In addition to the enlargement display of the target instrument, the display color may simultaneously be changed in order to further highlight the deformed target instrument.

On the other hand, as shown in FIG. 5B, because the regions except for the instruments 1 and 3 are the non-deformation region, the regions except for the instruments 1 and 3 are changed by the drawing distortion unit 21 such that the scale of the regions except for the instruments 1 and 3 is reduced compared with the scale of FIG. 5A. That is, the scale of the non-deformation region is adjusted, because the adjustment such as the securement of the display space is required with the enlargement of the primary connection instrument which is of the deformation region.

Thus, in the deformation condition of the fifth embodiment, because the deformation display of the continuous operation instrument is performed, advantageously the sight line is easily induced to the area on which attention is focused during the instrument operation. Additionally, appropriateness of the instrument operation can be determined by referring to the parameters displayed near the continuous operation instrument, and the plant can efficiently be operated.

Sixth Embodiment

Figure 6A:
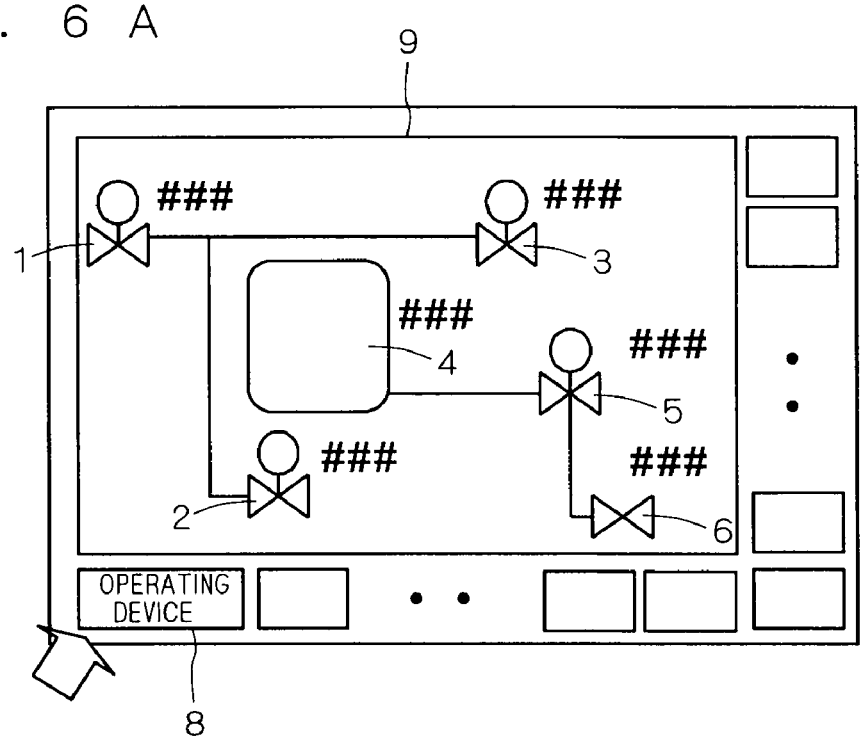
FIGS. 6A and 6B are views for explaining a deformation condition of a plant information display device according to a sixth embodiment of the invention.
Figure 6B:
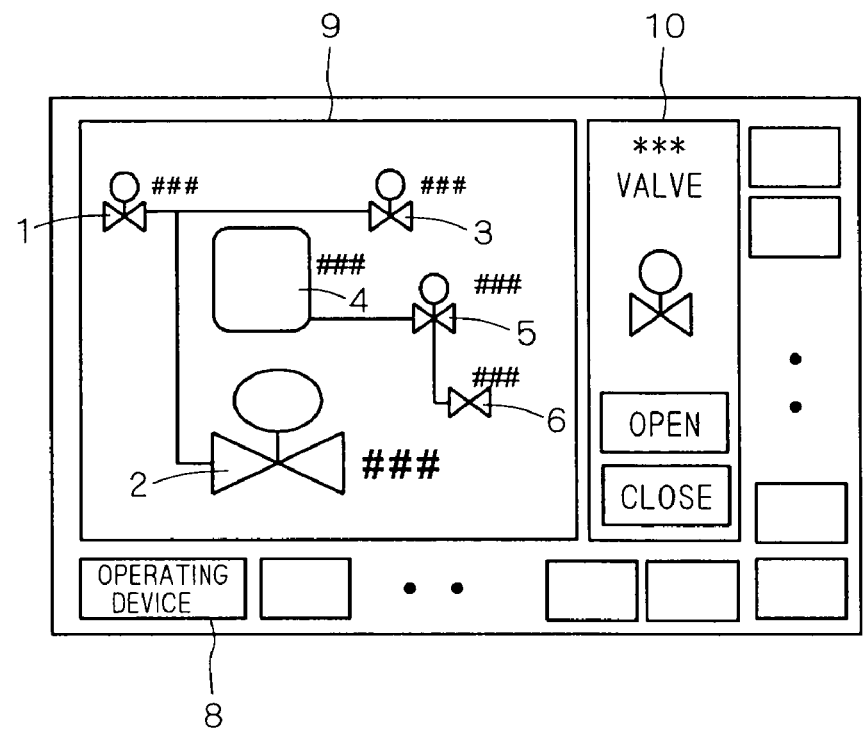

FIGS. 6A and 6B show schematic views of deformation processing performed by a plant information display device according to a sixth embodiment of the invention. The deformation processing shown in FIGS. 6A and 6B aims at a drawing 9 which shows the instrument system whose display area is reduced in displaying an instrument operation setting screen 10.

As shown in FIG. 6A, an operating device 8 is pressed to select the instrument 2 which is of the operation target. Then, the drawing 9 showing the instrument system is reduced while the instrument operation setting screen 10 of the instrument 2 is displayed on the screen. The deformation function of the drawing distortion unit 21 changes sizes of the displayed instruments 1 to 6 and piping to displayable sizes to tentatively compute a reduction ratio according to the drawing 9 showing the instrument system reduced as shown in FIG. 6B. Then, the deformation is performed to the deformation target region divided by the region division unit 15. In FIG. 6B, only the instrument 2 which is of the operation instrument is enlarged and displayed.

On the other hand, as shown in FIG. 6B, because the regions except for the instrument 2 are the non-deformation region, the non-highlighted data generation function of the drawing distortion unit 21 re-computes the tentative reduction ratio to change the reduction ratio of the non-deformation target region in consideration of the size of the deformed instrument 2.

Although the screen simultaneously displayed along with the drawing 9 showing the instrument system is set to the instrument operation setting screen 10 in FIGS. 6A and 6B, the invention is not limited to the instrument operation setting screen 10. For example, an instrument operation setting screen or plural screens including an instrument parameter display screen necessary for the plant running may be used.

Thus, in the deformation condition of the sixth embodiment, even if the instrument operation setting screen 10 and the like are displayed on the same screen, because all the pieces of information can be displayed on the single screen without hiding the information, the plant state can be recognized while the number of flow lines is decreased compared with utilization of a multi-screen.

Seventh Embodiment

Figure 7A:
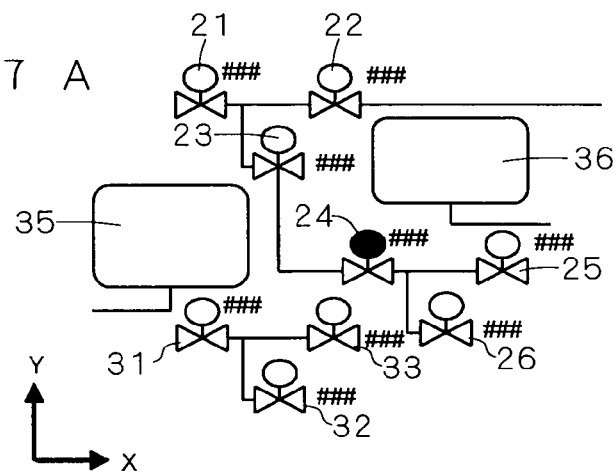
FIGS. 7A to 7C are views for explaining region discrimination of a plant information display device according to a seventh embodiment of the invention.
Figure 7B:
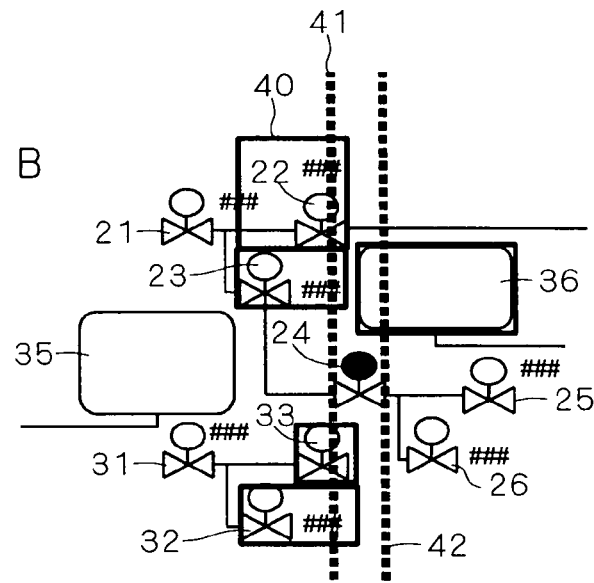
Figure 7C:
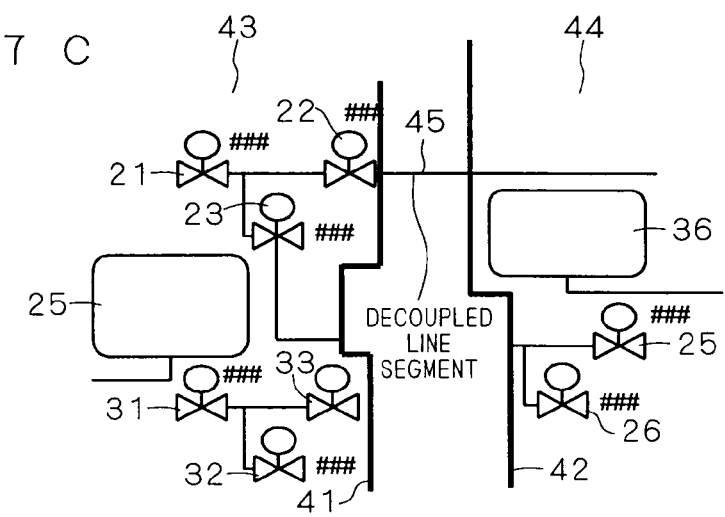

FIGS. 7A to 7C are views for explaining a method for dividing the region into the deformation target region and the non-deformation target region in the region division unit 15. For the purpose of simple description, the deformation target region includes only the operation target instrument. However, the invention is not limited to the case in which the deformation target region includes only the operation target instrument.

FIG. 7A shows four systems, that is, instruments 22 to 26 which are connected into a tree shape to the instrument 21, instruments 32 and 33 which are connected in parallel to the instrument 31, an instrument 35, and an instrument 36. When the instrument 24 is set to the operation target instrument in FIG. 7A, the region division unit 15 virtually produces two line segments parallel to a Y axis of the drawing (hereinafter the parallel line segments are also referred to as virtual line segment). In the virtual line segments parallel to the Y axis, a first (left side of the drawing) virtual line segment 41 is horizontally moved in parallel with the Y axis to an X coordinate value initially contacting a part of the instrument 24 which is of the operation target instrument, and a second (right side of the drawing) virtual line segment 42 is also moved in parallel with the Y axis to an X coordinate value finally contacting the instrument 24 (FIG. 7B). In the case where the virtual line segments 41 and 42 sandwiching the instrument 24 intersect the pattern elements (hereinafter also referred to as instrument symbols) expressing other instruments as shown in FIG. 7B, the virtual line segments 41 and 42 are formed into polygonal lines along a boundary 40 of the instrument symbol such that the intersection is eliminated (FIG. 7C).

As shown in FIG. 7C, two non-deformation target regions 43 and 44 are produced by the above-described processing. On the other hand, a line segment element (hereinafter also referred to as decoupled line segment 45) sandwiched between the two virtual line segments is extracted using geometrical information (for example, a polygonal line equation of the virtual line segments including X=p in the case of a<Y<b and X=q in the case of c<Y<d) on the two polygonal line virtual line segments 41 and 42 shown in FIG. 7C. The decoupled line segment 45 becomes the deformation target region through the processing.

Instead of the line segments parallel to the Y axis, the division can be performed using line segments parallel to the X axis. The region can finely be divided using the two line segments parallel to the Y axis and the two line segments parallel to the X axis. Even if the deformation processing is performed to the operation target instrument and the instrument having the high possibility of the next operation like the fifth embodiment, the similar deformation processing can be performed by applying the division processing to each instrument.

Thus, the region division unit 15 of the seventh embodiment divides the drawing data into the deformation target region and the non-deformation target region on the basis of the boundary 40 of other instruments and the virtual line segment 41 and 42 sandwiching the operation target instrument 2 which is of the interest region. Therefore, the drawing can easily be divided into plural regions.

Eighth Embodiment

Figure 8A:
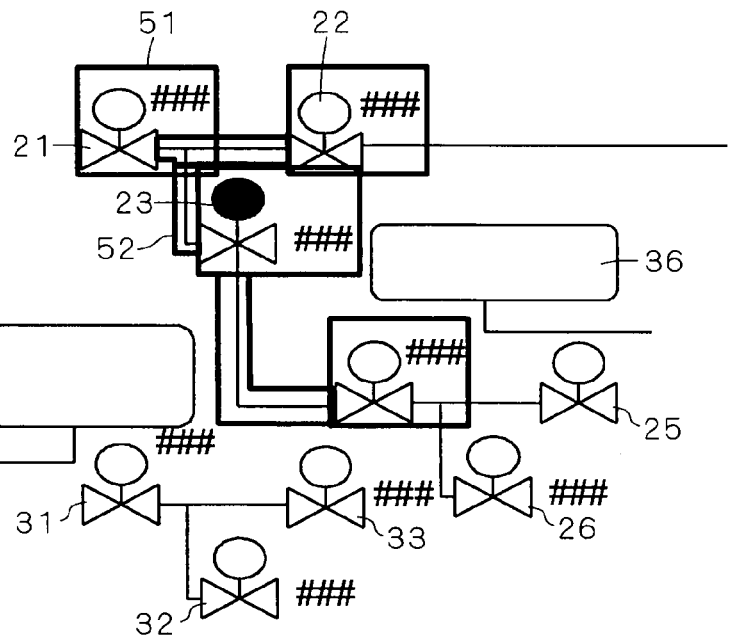
FIGS. 8A and 8B are views for explaining region discrimination of a plant information display device according to an eighth embodiment of the invention.
Figure 8B:
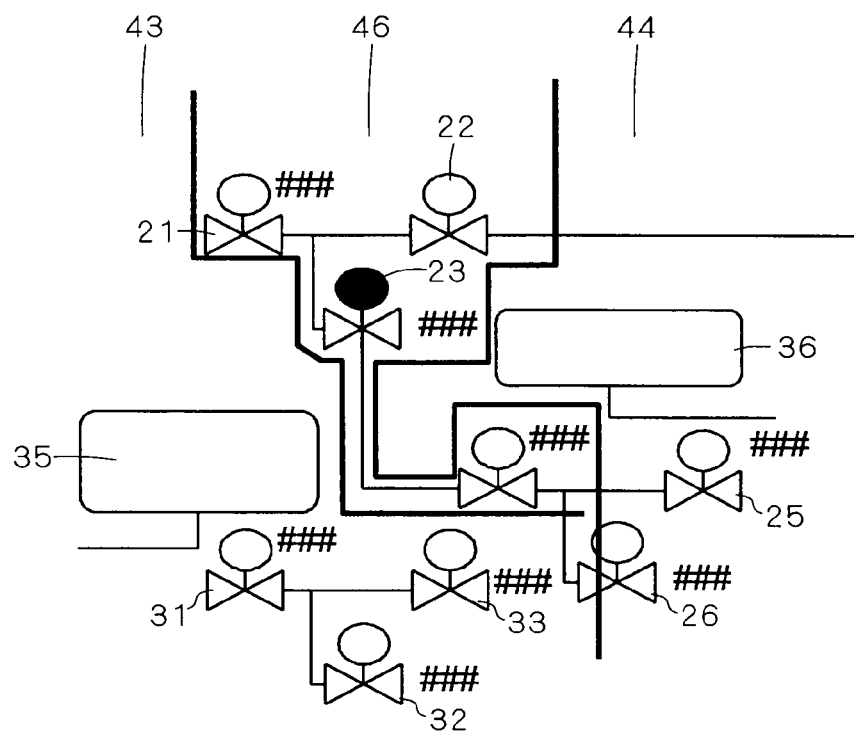

FIGS. 8A and 8B are views for explaining a method for dividing the region into the deformation target region and the non-deformation target region in the region division unit 15. In the eighth embodiment, particularly the region is divided into the deformation target region and the non-deformation target region in order to perform the deformation display of the operation target instrument, plural instrument groups (primary connection instrument) directly connected to the operation target instrument, or a piping group connecting the instruments.

The operation target instrument and the primary connection instrument can be extracted based on the information on the logical connection between the facilities. The region division unit 15 automatically produces the operation target instrument, the primary connection instrument, and the piping thereof in closed rectangular regions including the instrument symbol on the basis of the geometrical information such as a coordinate value and a rotation angle of the instrument symbol expressing each instrument or piping.

The description will specifically be made with reference to FIG. 8A. FIG. 8A shows four systems, that is, the instruments 22 to 26 which are connected into the tree shape to the instrument 21, the instruments 32 and 33 which are connected in parallel to the instrument 31, the instrument 35, and the instrument 36. In FIG. 8A, the instrument 23 is set to the operation target instrument, and the instruments 21, 22, and 24 directly connected to the instrument 23 are set to the primary connection instrument. As shown in FIG. 8A, the region division unit 15 produces four closed rectangular regions 51 for the instruments 21, 22, 23, and 24 and three closed rectangular regions 52 for the piping on the basis of the geometrical information on the piping provided among the instruments 21, 22, 23, and 24.

Then, as shown in FIG. 8B, the region division unit 15 makes the determination of a minimum deformation target region 46 by obtaining a sum of sets of the produced seven closed rectangular regions 51 and 52. The regions except for the deformation target region 46 constitute the non-deformation target regions 43 and 44. When the third embodiment is applied to the deformation target region 46, the deformation processing can be performed to the operation target instrument (instrument 23) and the primary connection instruments (instruments 21, 22, and 24). Although the determination of the deformation target region 46 is made by obtaining the sum of sets in the region division unit 15 of the eighth embodiment, the invention is not limited to the eighth embodiment. For example, the determination that the closed rectangular region including all the seven closed rectangular regions 51 and 52 is the deformation target region may be made.

Thus, in the region division unit 15 of the eighth embodiment, the instrument 23 which is of the interest region, the instruments 21, 22, and 24 directly connected to the instrument 23, and the piping connecting the instrument 23 and the instruments 21, 22, and 24 are specified as the closed rectangular regions 51 and 52, and the sum of sets of the closed rectangular regions 51 and 52 is obtained to set the region of the sum of sets to the deformation target region. Therefore, the deformation target region can easily be obtained.

Ninth Embodiment

Figure 9A:
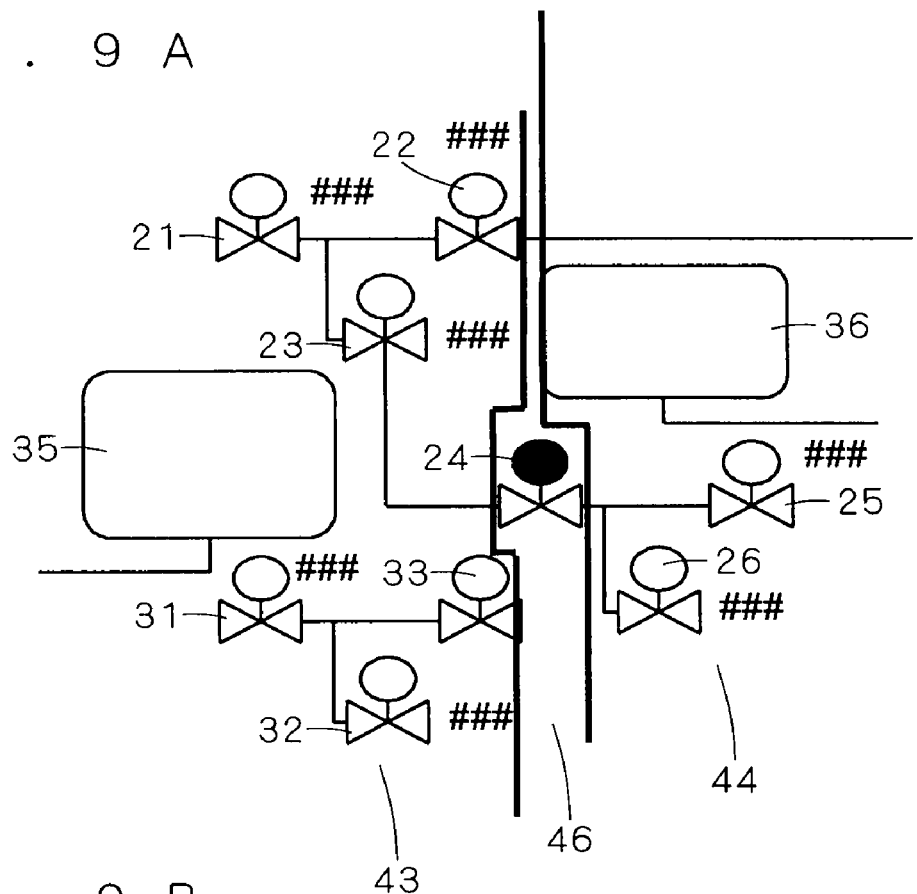
FIGS. 9A and 9B are views for explaining region discrimination of a plant information display device according to a ninth embodiment of the invention.
Figure 9B:
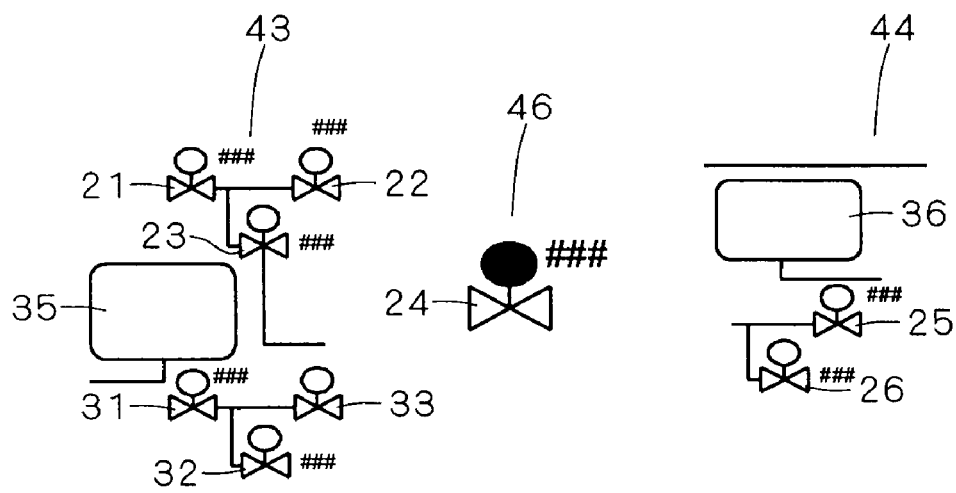

FIGS. 9A and 9B are views for explaining non-deformation target region processing in a drawing distortion unit 21 according to a ninth embodiment of the invention. FIG. 9A shows the non-deformation target region 43, the non-deformation target region 44, and the deformation target region 46 (including blacked-out instrument symbol (operation target instrument)) divided in the seventh or eighth embodiment. The deformation function of the drawing distortion unit 21 deforms the deformation target region by various highlighting methods such as the enlargement, reduction, rotation, and color change.

On the other hand, in consideration of the display region or an aspect ratio of the drawing, the drawing distortion unit 21 changes the scale in order to match the drawing data of the non-deformation target region with the drawing data of the deformed deformation target region. Although the non-highlighted data generation function of the drawing distortion unit 21 can change the scale to the desired scale of the user, the scale is finally restricted to the range in which the drawing can be reconstructed by the combination of the drawing data of the deformed deformation target region and the drawing data of the non-deformation target region.

Thus, because the processing shown in FIGS. 9A and 9B is performed in the ninth embodiment, the drawing is finely divided, the deformation processing can be performed to each finely-divided region, and the deformed drawing can be produced according to the desired display state of the user.

Tenth Embodiment

Figure 10A:
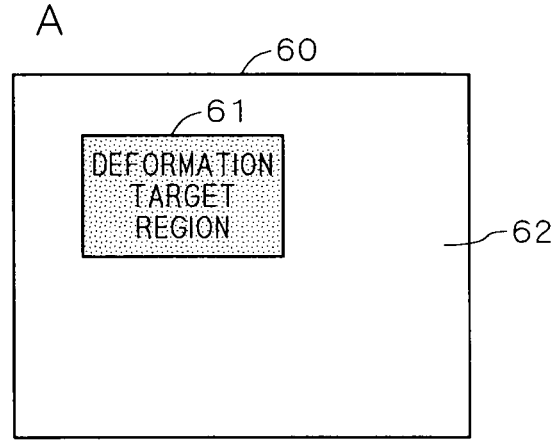
FIGS. 10A to 10C are views for explaining non-highlighted data generation of a plant information display device according to a tenth embodiment of the invention.
Figure 10B:
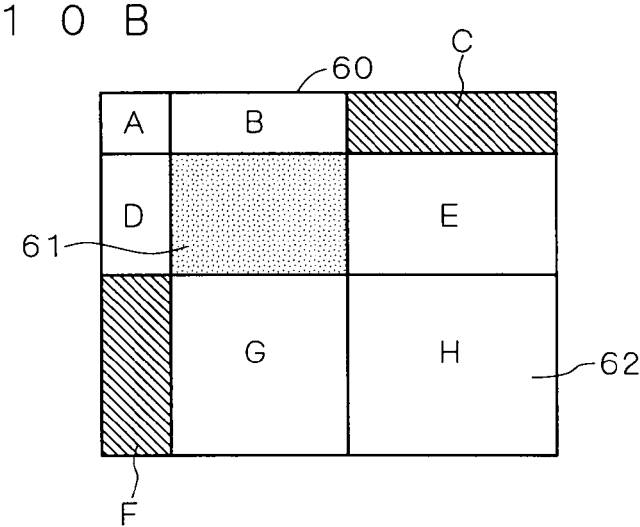
Figure 10C:
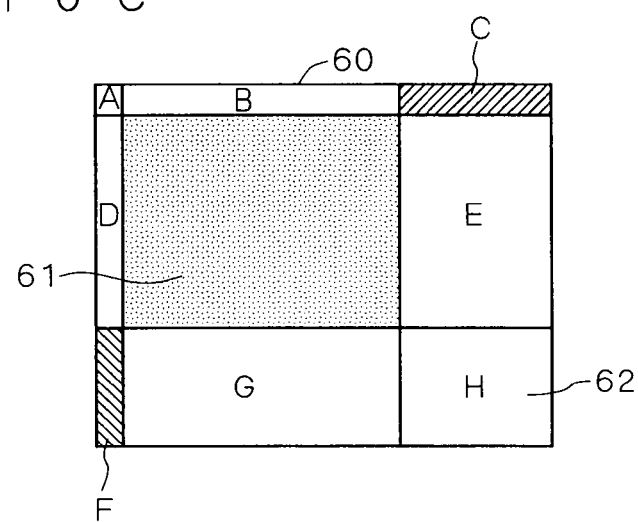

FIGS. 10A to 10C are views for explaining non-deformation target region processing in a non-highlighted data generation function of a drawing distortion unit 21 according to a tenth embodiment of the invention. In FIG. 10A, the region division unit 15 divides a drawing 60 into a deformation target region 61 and a non-deformation target region 62. The case in which the deformation target region 61 is enlarged and displayed by the deformation function of the drawing distortion unit 21 will be described with reference to FIG. 10A.

The display size of the deformation target region 61 is determined by specified magnification or mouse operation. As shown in FIG. 10B, the drawing distortion unit 21 of the tenth embodiment divides the non-deformation target region 62 into plural regions on the basis of a positional relationship of the deformation target region 61 before the change of the display size. That is, the non-deformation target region 62 is divided into the plural regions by utilizing each side of the deformation target region 61. In FIG. 10B, the non-deformation target region 62 is divided into eight regions A, B, C, D, E, F, G, and H.

As shown in FIG. 10C, the drawing distortion unit 21 of the tenth embodiment divides the non-deformation target region 62 into plural regions on the basis of the display size after the deformation processing. The non-highlighted data generation function of the drawing distortion unit 21 of the tenth embodiment computes each scale in X and Y directions of each of the regions (eight regions A, B, C, D, E, F, G, and H) on the basis of a divided region corresponding relationship before and after the deformation processing (compared FIG. 10B with FIG. 10C).

The drawing distortion unit 21 of the tenth embodiment performs the change such as the reduction to the drawing data of the non-deformation target region 62 of each region on the basis of the computed scale. For example, as shown in FIG. 10C, after the deformation processing, the region C further becomes horizontally long and the region F further becomes vertically long.

Thus, the non-highlighted data generation function of the drawing distortion unit 21 of the tenth embodiment divides the non-deformation target region into the plural regions, the non-highlighted data generation function computes the scale of each region before and after the deformation processing, and the non-highlighted data generation function changes the drawing data of the non-deformation target region of each region on the basis of the scale. Therefore, the deformation processing can easily be performed based on the display area size, and drawing production cost can be reduced. The similar processing can be performed in the case where the deformation function of the drawing distortion unit 21 performs the reduction display.

Eleventh Embodiment

FIGS. 11A to 11E are views for explaining non-deformation target region processing in a non-highlighted data generation function of a drawing distortion unit 21 according to an eleventh embodiment of the invention. In FIG. 11A, the region division unit 15 divides the drawing 60 into the deformation target region 61 and the non-deformation target region 62. Unlike the tenth embodiment, the deformation target region 61 of the eleventh embodiment has a projected rectangular shape. The case in which the deformation target region 61 is enlarged and displayed by the deformation function of the drawing distortion unit 21 will be described with reference to FIG. 11A.

The display size of the deformation target region 61 is determined by the specified magnification or the mouse operation. As shown in FIG. 11B, the non-highlighted data generation function of the drawing distortion unit 21 of the eleventh embodiment divides the non-deformation target region 62 into plural regions on the basis of the positional relationship of the deformation target region 61 before the change of the display size. In the case where the deformation target region 61 has the projected rectangular shape as shown in FIG. 11A, the non-deformation target region 62 can be divided in the horizontal and vertical directions unlike the case of FIG. 10B.

The non-deformation target region 62 can be divided in two cases. That is, the non-deformation target region 62 is divided into the regions B, D, and E by utilizing each side in the horizontal direction of the deformation target region 61 as shown in FIG. 11B, and the non-deformation target region 62 is divided into the regions B, C, and D by utilizing each side in the vertical direction of the deformation target region 61 as shown in FIG. 11D. In FIG. 11B, the non-deformation target region 62 is divided into the eight regions A, B, C, D, E, F, G, and H. In FIG. 11D, the non-deformation target region 62 is divided into the sixth regions A, B, C, D, E, and F. For the division direction, in addition to the previously-defined method, the division direction may be selected in consideration of the number of symbols distorted by performing the different scale changes in the X and Y directions.

As shown in FIG. 11C or 11E, the non-highlighted data generation function of the drawing distortion unit 21 of the eleventh embodiment divides the non-deformation target region 62 into plural regions on the basis of the display size after the deformation processing. The non-highlighted data generation function of the drawing distortion unit 21 of the eleventh embodiment computes each scale in X and Y directions of each of the regions (eight regions A, B, C, D, E, F, G, and H or six regions A, B, C, D, E, and F) on the basis of the divided region corresponding relationship before and after the deformation processing (compared FIG. 11B with FIG. 11C or FIG. 11D with FIG. 11E).

The drawing distortion unit 21 of the eleventh embodiment performs the change such as the reduction to the drawing data of the non-deformation target region 62 of each region on the basis of the computed scale. For example, as shown in FIG. 11C, after the deformation processing, the region G further becomes horizontally long. As shown in FIG. 11E, after the deformation processing, the region E further becomes horizontally long, and the region D further becomes vertically long.

Thus, similarly to the tenth embodiment, the drawing distortion unit 21 of the eleventh embodiment can virtually divide the drawing into the plural regions, the drawing distortion unit 21 can compute the scale of each region before and after the deformation processing. Therefore, the deformation processing can easily be performed based on the display area size, and the drawing production cost can be reduced. In the eleventh embodiment, the similar processing can be performed in the case where the deformation target region 61 has a recessed rectangular shape or in the case where the deformation function of the drawing distortion unit 21 performs the reduction display.

Twelfth Embodiment

Figure 12A:
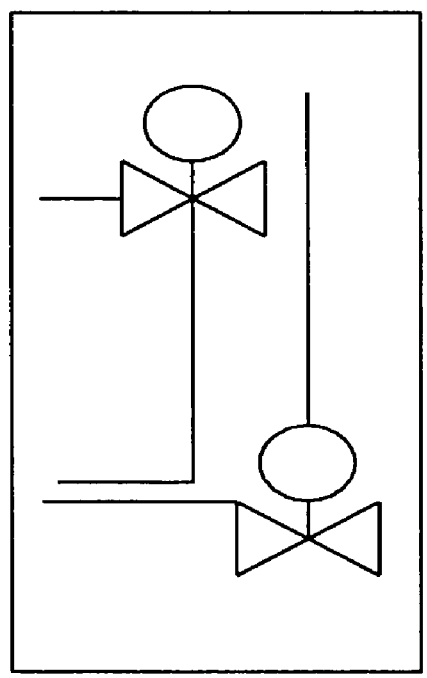
FIGS. 12A to 12D are views for explaining non-highlighted data generation of a plant information display device according to a twelfth embodiment of the invention.
Figure 12B:
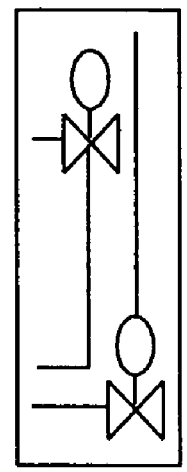
Figure 12C:
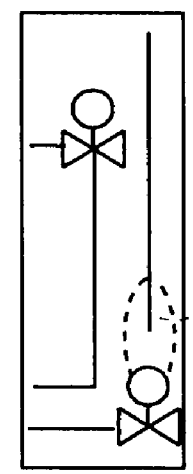
Figure 12D:
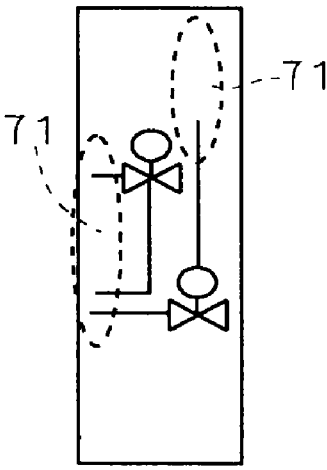

FIGS. 12A to 12D are views for explaining processing performed to the divided regions of the non-deformation target region changed in the tenth or eleventh embodiment. In the case where the scale is changed such that the divided regions of the non-deformation target region become vertically long as shown in FIG. 12A, it is thought that three different pieces of processing of FIGS. 12B to 12D are performed to the drawing data of the region.

In FIG. 12B, the instrument symbol (drawing data) included in the divided region is also changed according to the scale. The scale is changed such that the divided regions become vertically long. In the case where the processing is performed as shown in FIG. 12B, although the processing is easily performed because the same scale is utilized, the shape of the instrument symbol differs largely from the original shape because the instrument symbol becomes vertically or horizontally long.

In FIG. 12C, in the instrument symbols (drawing data) included in the divided region, the line segment expressing the piping or the polygonal line symbol is changed according to the scale of the region, and the symbol expressing the valve or the like is changed with the same magnification of the scale of the region. The scale of the region is selected from the smaller scale in the X or Y direction. In the case where the processing is performed as shown in FIG. 12C, although the shape of the symbol expressing the valve or the like is similar to the original shape, interpolation processing is required because a discontinuous portion 70 is generated between the symbol expressing the piping and the symbol expressing the valve or the like.

In FIG. 12D, all the instrument symbols (drawing data) included in the divided region are changed with the same magnification of the scale of the region. The scale of the region is selected from the smaller scale in the X or Y direction. In the case where the processing is performed as shown in FIG. 12D, although the shapes of all the instrument symbols are similar to the original shapes, the interpolation processing is required because a discontinuous portion 71 is generated between the instrument symbol and the adjacent region.

Thus, in the twelfth embodiment, the scale can be changed for the instrument symbol (drawing data) of the divided region if needed, and the drawing can flexibly be produced.

Thirteenth Embodiment

Figure 13A:
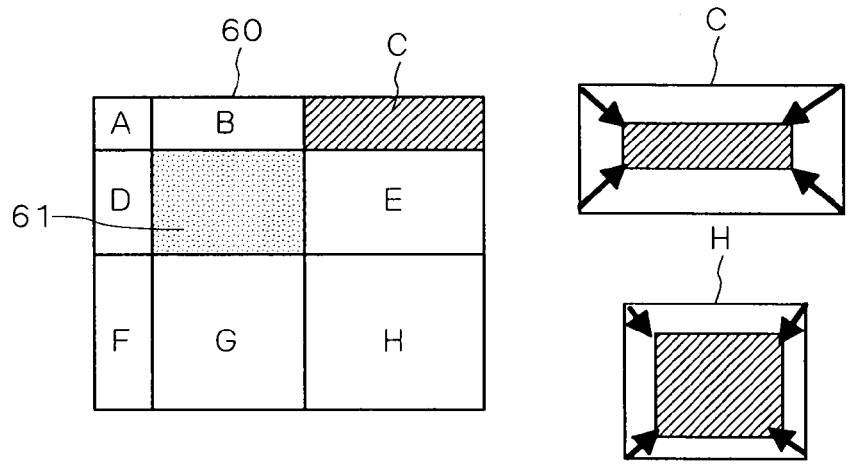
FIGS. 13A to 13C are views for explaining interpolation of a plant information display device according to a thirteenth embodiment of the invention.
Figure 13B:
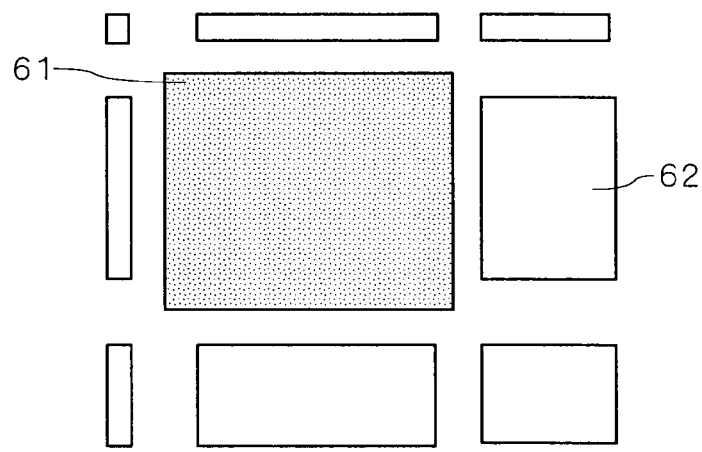
Figure 13C:
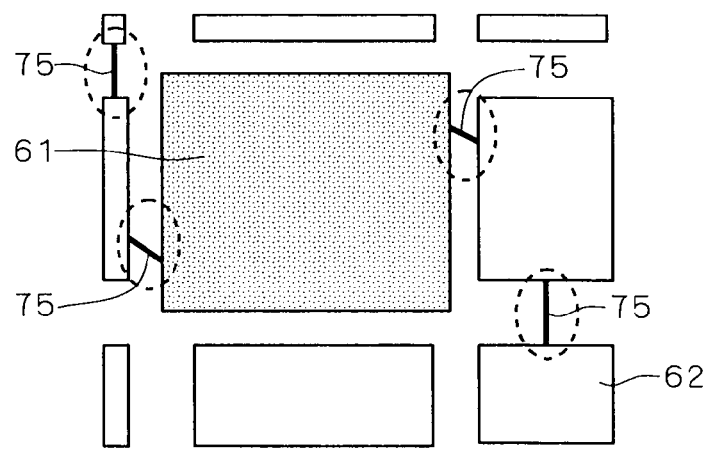

FIGS. 13A to 13C are views for explaining the processing performed to the divided regions of the non-deformation target region changed in the tenth or eleventh embodiment. Similarly to the case of FIG. 10B, the non-deformation target region 62 of FIG. 13A is divided into the eight regions A, B, C, D, E, F, G, and H. In the case where the deformation processing is performed to enlarge the deformation target region 61 of FIG. 13A, each divided region is changed into an arbitrary shape by the mouse or the like. FIG. 13A shows an example in which the regions C and H are reduced.

FIG. 13B shows the drawing after the changing processing is performed to each region. In FIG. 13B, because the adjacent regions become discontinuous, the drawing distortion unit 21 performs the interpolation using a pattern element 75 such as the line segment and the polygonal line on the basis of the information on the logical connection between the facilities as shown in FIG. 13C. Although the deformation target region 61 has the rectangular shape in the thirteenth embodiment, the invention is not limited to the rectangular shape. For example, the deformation target region 61 may have a projected rectangular shape or a recessed rectangular shape.

Thus, in the thirteenth embodiment, after the non-highlighted data generation function of the drawing distortion unit 21 arbitrarily changes the plural divided regions of the non-deformation target region 62, the drawing distortion unit 21 uses the pattern element to perform the interpolation connection between the plural divided regions of the non-deformation target region 62 and between the plural divided regions and the deformation target region on the basis of the logical connection information of the topological information. Therefore, the shape can be distorted in each region, the drawing such as periodic check result and accident result in which the attention is focused on a specific area or facility can easily be produced to improve the work efficiency.

Fourteenth Embodiment

Figure 14A:
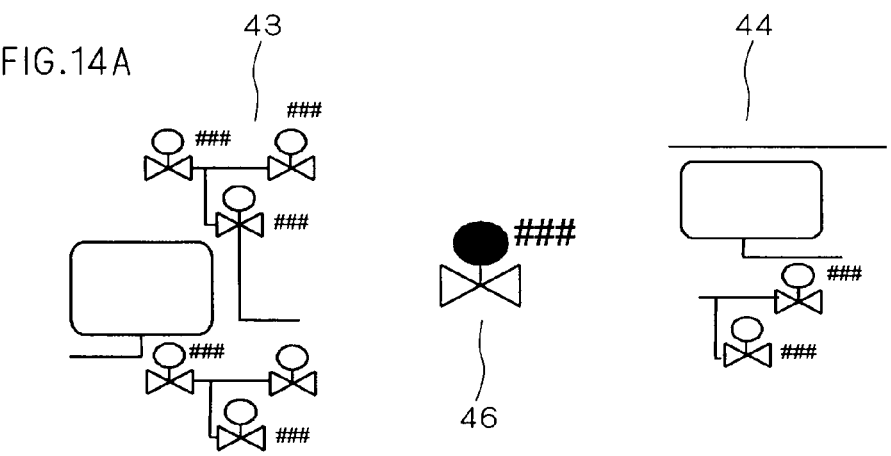
FIGS. 14A to 14D are views for explaining interpolation of a plant information display device according to a fourteenth embodiment of the invention.

FIGS. 14A to 14D are views for explaining a method of combining the deformation target region and the non-deformation target region. In FIG. 14A, the processing of the ninth embodiment is performed, the deformation processing is performed to the deformation target region 46 in order to enlarge and display the deformation target region 46, and the scale change is performed to the non-deformation target regions 43 and 44 in order to change the scales of the non-deformation target regions 43 and 44.

In the case where the deformation target region and the non-deformation target regions are combined, each region is connected based on the information on the logical connection between the facilities. For example, the line segment connected to the deformation target region 46 is extracted from the non-deformation target region 43 on the basis of the topological information, and the regions are connected such that the deformation target region 46 connected to the line segment is adjacent to the line segment.

Figure 14B:
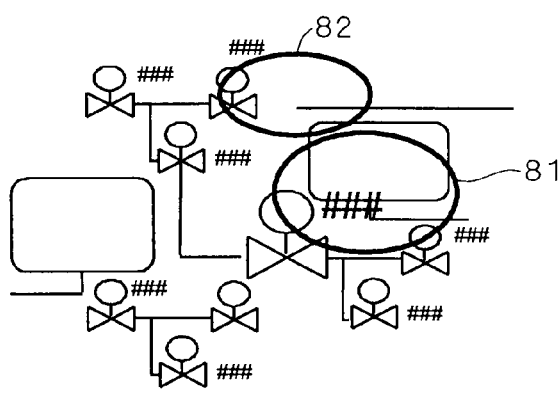

FIG. 14B shows the drawing after the regions are connected. FIG. 14B is an incomplete drawing because an overlapping 81 between the regions and a lack 82 of the decoupled line segment are generated. Therefore, the overlapping 81 is removed by translating one of the regions. The lack 82 of the decoupled line segment is covered by performing the interpolation of the line segment. As a result, the drawing shown in FIG. 14C is produced to show a line segment 83 covering the lack 82 of the decoupled line segment.

Figure 14C:
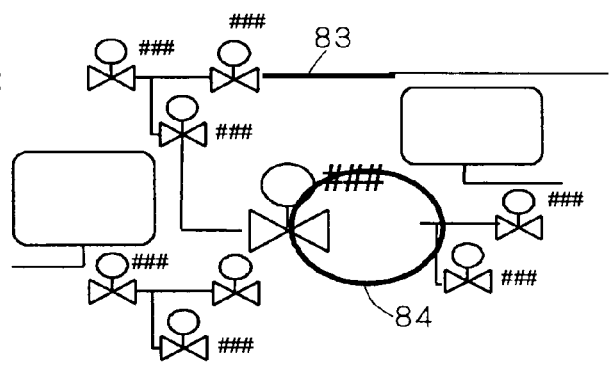
Figure 14D:
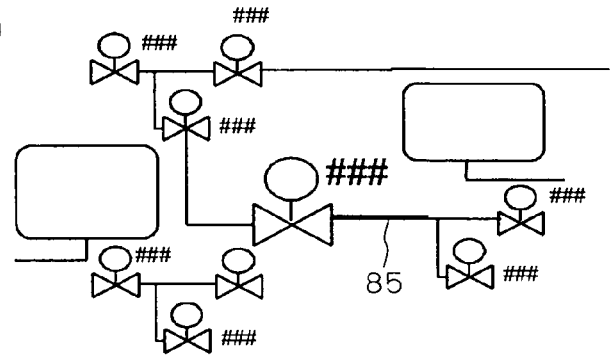

However, in FIG. 14C, a gap 84 is generated because one of the regions is translated in order to eliminate the overlapping 81 between the regions of FIG. 14B. Therefore, it is necessary that the gap 84 be finally interpolated with the line segment. In FIG. 14D, the regions adjacent to each other are connected by interpolating the gap 84 with a line segment 85.

In principle, the pattern element to be interpolated follows the pattern element expressing the piping. However, the connection can also be performed using the pattern element which is arbitrarily specified by the user. In the case where the interpolation is performed by adding the pattern element of the same sort to the already-existing pattern element, the plural pattern elements can also be put together. For example, in the case where the already-existing line segment and added line segment exist, ends of the two line segments can be connected to form the one line segment.

Thus, in the fourteenth embodiment, even if the deformation target region and the non-deformation target region are disposed at arbitrary positions, the regions adjacent to each other can be connected without changing the topology state between the regions, so that the desired drawing of the user can arbitrarily reconstructed.

Fifteenth Embodiment

Figure 15B:
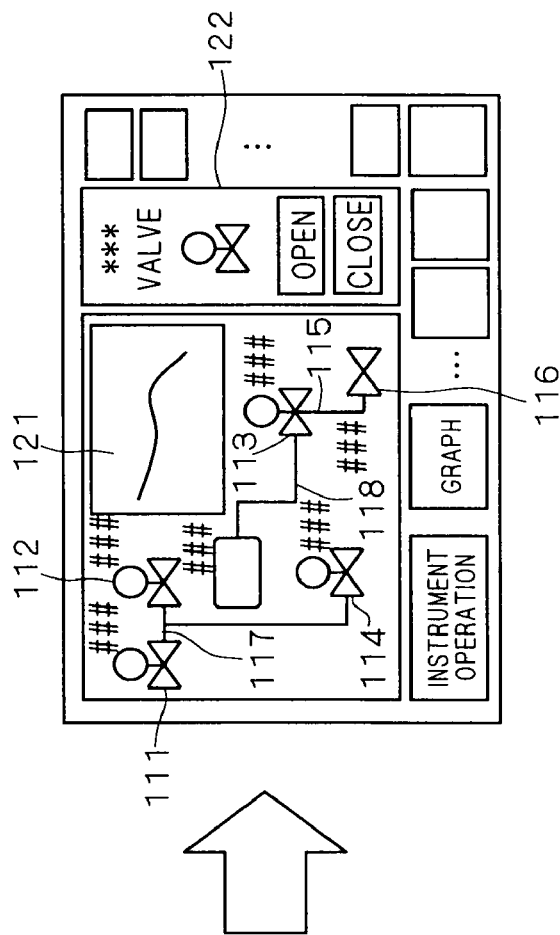
FIGS. 15A and 15B are views for explaining interpolation of a plant information display device according to a fifteenth embodiment of the invention.
Figure 15A:
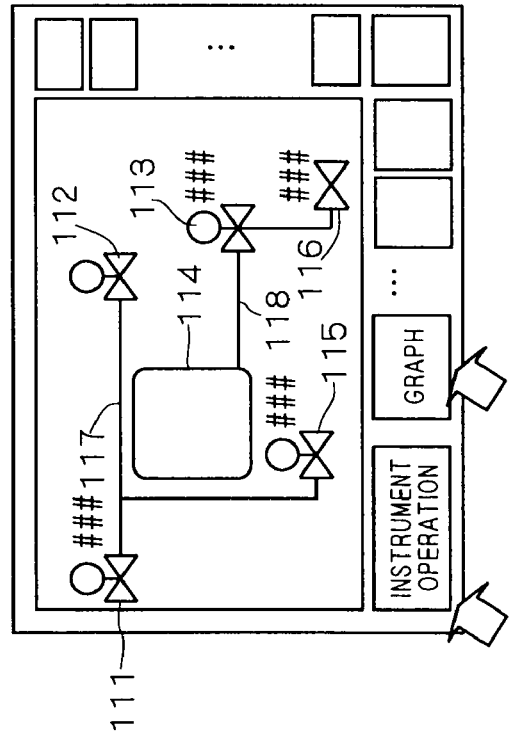

FIGS. 15A and 15B show schematic views of drawing distortion processing performed by a plant information display device according to a fifteenth embodiment of the invention. In the drawing distortion processing shown in FIGS. 15A and 15B, the graphics are moved and distorted such that the screen and graph and the already displayed drawing are not displayed while overlapping each other in the situation in which the instrument operating screen is displayed prior to the instrument operation or in the situation in which the graph is displayed in order to confirm a temporal transition of each instrument parameter.

FIG. 15A shows the state before the drawing distortion. FIG. 15A shows two systems, that is, a system of instruments 111, 112, and 115 and a system of instruments 113, 114, and 116.

As shown in FIG. 15B, in the case where a parameter monitoring graph 121 and an instrument operating screen 122 are displayed while the screen of FIG. 15A is already displayed, the symbol completely included in the display region of the graph or instrument operation screen or the symbol intersecting the region is extracted. At the same time, the symbol extended over the inside and outside of the region is also extracted. In the fifteenth embodiment, the instruments 112 and 113 are extracted as the symbol included or intersecting the region, and the piping 117 is extracted as the symbol extended over the inside and outside of the region. At this point, the information (hereinafter referred to as mutual connection information) that the instrument 112 and the piping 117 are connected to each other is also retained. The mutual connection information on the instrument 113 and the piping 118 is also retained. Then, in the extracted symbols, processing for moving the symbol to the outside of the region is sequentially performed from the symbol closer to the region such that the symbol is not included or such that the symbol does not intersect the region. In FIG. 15B, the instrument 112 and the instrument 113 are sequentially processed. Then, an end point of the piping 117 is moved so as to be connected to the instrument 112 after the movement according to the mutual connection information. On the other hand, in the case where an end point of the piping 118 is also moved according to the movement of the instrument 113, the connection is performed by forming the polygonal line of the line segment in consideration of the position after the movement. Obviously the drawing can also be performed as an oblique line segment by simply moving the end point.

Thus, in the drawing distortion of the fifteenth embodiment, because all the pieces of information can be displayed so as not to overlap one another, advantageously the plant state can be recognized without deteriorating the visibility.

Sixteenth Embodiment

FIGS. 16A and 16B show schematic views of drawing distortion processing and deformation processing performed by a plant information display device according to a sixteenth embodiment of the invention. In the drawing distortion processing and deformation processing shown in FIGS. 16A and 16B, the graphics are moved and distorted such that the screen and graph and the already displayed drawing are not displayed while overlapping each other, and the symbol on which the attention is focused is highlighted in the drawing in the situation in which the instrument operating screen is displayed prior to the instrument operation or in the situation in which the graph is displayed in order to confirm a temporal transition of each instrument parameter.

FIG. 16A shows the state before the drawing distortion and deformation. FIG. 16A shows two systems, that is, the system of the instruments 111, 112, and 115 and the system of the instruments 113, 114, and 116.

As shown in FIG. 16B, in the case where the parameter monitoring graph 121 and the instrument operating screen 122 are displayed while the screen of FIG. 16A is already displayed, the symbol completely included in the display region of the graph or instrument operation screen or the symbol intersecting the region is extracted. At the same time, the symbol extended over the inside and outside of the region is also extracted. In the sixteenth embodiment, the instruments 112 and 113 are extracted as the symbol included or intersecting the region, and the piping 117 is extracted as the symbol extended over the inside and outside of the region. At this point, the information (hereinafter referred to as mutual connection information) that the instrument 112 and the piping 117 are connected to each other is also retained. The mutual connection information on the instrument 113 and the piping 118 is also retained. Then, in the extracted symbols, the processing for moving the symbol to the outside of the region is sequentially performed from the symbol closer to the region such that the symbol is not included or such that the symbol does not intersect the region. In FIG. 16B, the instrument 112 and the instrument 113 are sequentially processed. Then, the end point of the piping 117 is moved so as to be connected to the instrument 112 after the movement according to the mutual connection information. On the other hand, in the case where the end point of the piping 118 is also moved according to the movement of the instrument 113, the connection is performed by forming the polygonal line of the line segment in consideration of the position after the movement. Obviously the drawing can also be performed as an oblique line segment by simply moving the end point. Then, the deformation display of the instrument 115 is performed according to the information on the interest region in the plant and the deformation condition which are fed from the input unit, the information on the next instrument which should be operated which is specified region determination unit, or the information on the instrument group or range influenced by the operation.

Thus, in the drawing distortion of the sixteenth embodiment, all the pieces of information can be displayed so as not to overlap one another, and the instrument or range on which the operator focuses the attention can be highlighted. Therefore, advantageously the sight line can be induced to the area on which the attention should be focused without deteriorating the visibility.

Seventeenth Embodiment

FIGS. 17A to 17D show examples of drawing distortion performed by a plant information display device according to a seventeenth embodiment of the invention. In the drawing distortion processing schematically shown in FIGS. 17A to 17D, the graphics are moved and distorted such that the screen and graph and the already displayed drawing are not displayed while overlapping each other in the situation in which the instrument operating screen is displayed prior to the instrument operation or in the situation in which the graph is displayed in order to confirm a temporal transition of each instrument parameter.

Figure 17A:
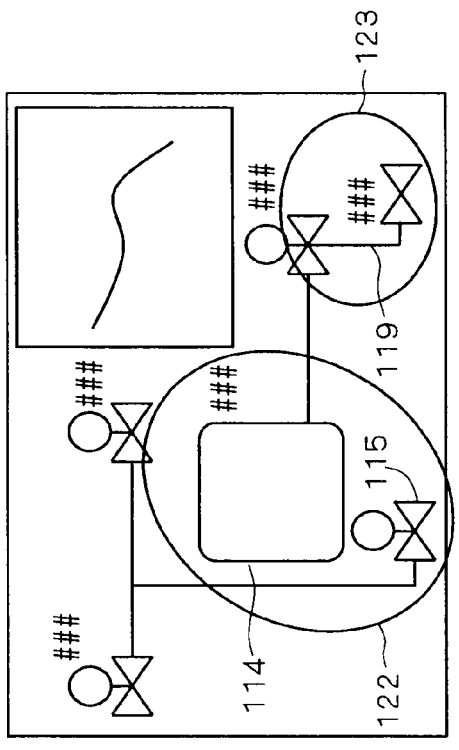
FIGS. 17A to 17D are views for explaining interpolation of a plant information display device according to a seventeenth embodiment of the invention.

FIG. 17A shows the state before the drawing distortion. FIG. 17A shows two systems, that is, the system of the instruments 111, 112, and 115 and the system of the instruments 113, 114, and 116.

Figure 17B:
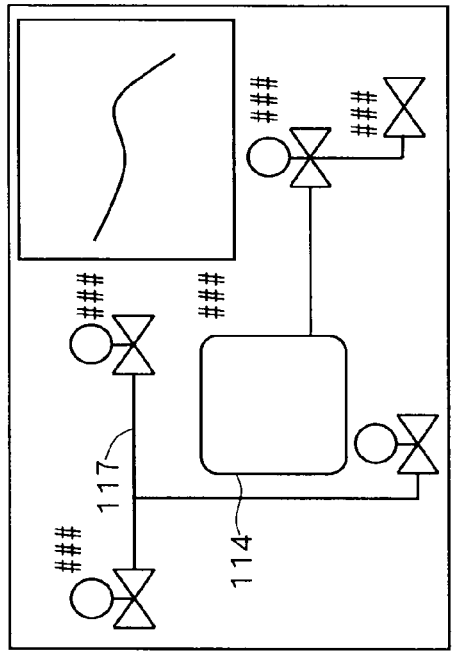

As shown in FIG. 17B, in the case where the parameter monitoring graph 121 is displayed while the screen of FIG. 17A is already displayed, the symbol completely included in the display region of the graph or instrument operation screen or the symbol intersecting the region is extracted. At the same time, the symbol extended over the inside and outside of the region is also extracted. In the seventeenth embodiment, the instruments 112 and 113 are extracted as the symbol included or intersecting the region, and the piping 117 is extracted as the symbol extended over the inside and outside of the region. At this point, the information (hereinafter referred to as mutual connection information) that the instrument 112 and the piping 117 are connected to each other is also retained. The mutual connection information on the instrument 113, the piping 118, and piping 119 is also retained. Then, in the extracted symbols, processing for moving the symbol to the outside of the region is sequentially performed from the symbol closer to the region such that the symbol is not included or such that the symbol does not intersect the region. In FIG. 17B, the instrument 112 and the instrument 113 are sequentially processed. Then, the end point of the piping 117 is moved so as to be connected to the instrument 112 after the movement according to the mutual connection information.

Figure 17C:
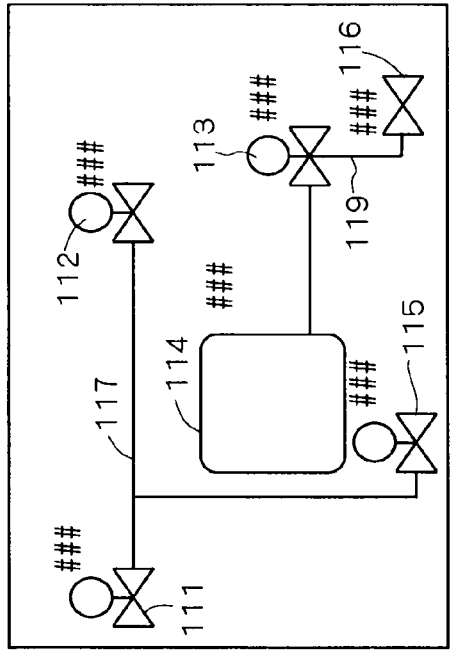
Figure 17D:
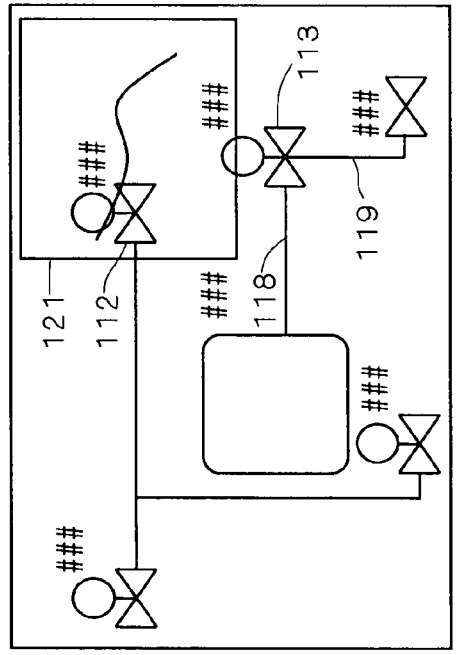

FIG. 17C shows the state after the movement. The instrument 114 is moved to the lower left of the drawing because interference with the instrument 114 at the point of a round mark 122 of FIG. 17C according to the movement of the instrument 112 to the left side of the drawing. Then, the instrument 115 is moved to the lower left of the drawing in order to avoid the interference with the instrument 114 after the movement. On the other hand, the instrument 113 and the piping 119 interfere with each other at the point of a round mark 123 of FIG. 17C. In end points of the piping 119, only the interfering end point is moved so as to be connected to the instrument 113. In the movement of the end point of the piping 119, because the interference with the instrument 116 is not generated, it is not necessary to move the instrument 116. Then, the end point of the piping 118 is also moved so as to be correctly connected to the instrument 113. As a result, as shown in FIG. 17D, the system diagram and the graph can be displayed so as not to overlap each other. The movement is performed such that a moving distance becomes the minimum. In addition to the above-described movement method, there is also a method in which a space where the symbol can be disposed in the drawing is found to move the symbol without interfering with other symbols. In the case where the original drawing is not accommodated in the screen due to the restriction of the screen display region, the drawing can be distorted while each symbol is reduced.

For the distortion method, the symbol moved to the outside of the target region steps away in a direction of a position vector from a barycenter of the display region of the graph 121 in FIG. 17A to the symbol which should be moved to the outside of the display region. In the method, the symbol steps radially away when viewed from the barycenter of the region. Obviously the direction in which the symbol steps away can be quantized. For example, the direction may be quantized in four directions from side to side and up and down or in eight directions divided further fined.

Thus, in the drawing distortion of the seventeenth embodiment, advantageously the display can be performed such that already-existing display screen is accommodated in the defined display region, and the display can be performed such that all the pieces of information do not overlap one another.

Eighteenth Embodiment

FIGS. 18A to 18C show schematic views of drawing distortion processing in a topology retaining state, which is performed by a plant information display device according to an eighteenth embodiment of the invention. In the drawing distortion processing in the topology retaining state shown in FIGS. 18A to 18C, the region division unit divides the drawing into plural regions, and the region is moved and distorted while the topology between the regions is retained. As used herein, as shown in FIG. 18C, the distortion shall mean the region change associated with the rotation of the region or the deformation of the specific element in the region in addition to the scale change of the whole of the region at the same ratio in the vertical and horizontal directions.

FIG. 18A shows the state in which the region division unit divides the drawing. Referring to FIG. 18A, when an instrument 130 drawn in the center is deformed, the region division unit produces a region 131 and a region 132 as the non-deformation target region. FIG. 18B schematically shows the line segment connecting the non-deformation target region and the region. The role of the line segment shown in FIG. 18B is described in the fourteenth embodiment. FIG. 18C shows a drawing of the line segment in the case where a region 132 which is of the non-deformation region is moved or distorted. The line segment follows the movement or distortion of the region 132 while retaining the positional relationship between the line segment and the region 132 before the movement and distortion.

Thus, in the drawing distortion processing in the topology retaining state of the eighteenth embodiment, the region divided by the region division unit can separately be moved and distorted without watching the topology, and the topology similar to that of the original drawing is secured after the movement and distortion. Therefore, advantageously it is not necessary to draw the line segment again.

Nineteenth Embodiment

FIGS. 19A and 19B show schematic views specification of a range influenced by an operation on the basis of topological information, which is performed by a plant information display device according to a nineteenth embodiment of the invention.

In the case where the range influenced by the operation of the instrument 111 of FIG. 19A is specified, other pattern elements connected to the instrument 111 are extracted from the geometrical information on the instrument 111. The line segment having one end point indicated by a mark of "o" in FIG. 19A is extracted through the processing. Then, the determination of the connection element is made for each line segment, and the processing is continued until the specific instrument is extracted. As a result, the instrument 112, 113, and 114 are extracted as shown in FIG. 19B, and the information on the logical connection between the instrument 111 and the instrument group is produced at this point.

Thus, in the specification of the range influence by the operation on the basis of the topological information of the nineteenth embodiment, because the range influence by the operation target instrument can dynamically be highlighted, the instrument operation can safely be performed while the operation target or the degree of influence is confirmed.

While the invention has been shown and described in detail, the foregoing description is in all aspects illustrative and not restrictive. It is therefore understood that numerous modifications and variations can be devised without departing from the scope of the invention.

What is claimed is:

1. A plant information display device which recognizes a plant state to display plant information necessary to operate instruments constituting said plant, the plant information display device comprising:
   an input unit;
   a region determination unit into which an interest region and a deformation condition in said plant are fed using said input unit, said region determination unit specifying a deformation target region based on said interest region and said deformation condition supplied from said input unit;

a region division unit which divides a drawing into a plurality of regions based on said deformation target region specified by said region determination unit, said region division unit performing management while said deformation target region and a non-deformation target region are divided;

a drawing distortion unit which separately deforms said deformation target region and said non-deformation target region;

a drawing output unit which supplies said deformation target region and said non-deformation target region as output data of said drawing, said deformation target region and said non-deformation target region being distorted by said drawing distortion unit; and a display unit which displays said output data supplied from said drawing output unit, wherein:

when said drawing and an additional object display region in which a plurality of screens including an operation setting screen of said instrument and an instrument parameter display screen necessary for plant running are displayed while overlapping each other, said drawing distortion unit extracts pattern elements included in said additional object display region based on said additional object display region, and sequentially moves said extracted pattern elements to an outside of said additional object display region in order from said pattern element existing near a center of said additional object display region;

when display is not accommodated in a display screen of said plant information display device, said drawing distortion unit divides said non-deformation target region into a plurality of regions, said drawing distortion unit moving said plurality of regions into which said non-deformation target region is divided and changing a scale thereof such that topology is retained between regions adjacent to each other with respect to said deformation target region and said non-deformation target region; and when a discontinuous portion is generated between the regions adjacent to each other due to said distortion by said drawing distortion unit, said drawing distortion unit uses, based on logical connection information of topological information, said pattern element to perform interpolation connection between said regions of said plurality of regions into which said non-deformation target region is divided, and between said region of said plurality of regions into which said non-deformation target region is divided and said deformation target region, such that topology similar to that of said original drawing is retained.

2. The plant information display device according to claim 1, wherein said region determination unit can use said input unit to specify said deformation condition.

3. The plant information display device according to claim 1, wherein only said instrument of said interest region is covered as a deformation target in said deformation condition.

4. The plant information display device according to claim 1, wherein said instrument of said interest region and a range influenced by an operation of said instrument are covered as a deformation target in said deformation condition.

5. The plant information display device according to claim 4, wherein said drawing distortion unit changes instruments and ranges to contracted and abstracted graphics except for said instrument of said interest region and said range influenced by an operation of said instrument of said interest region.

6. The plant information display device according to claim 1, wherein said instrument of said interest region and a range where next work is predicted based on a plant state or a work history of an operator are covered as a deformation target in said deformation condition.

7. The plant information display device according to claim 1, wherein, in displaying both said drawing and a plurality of screens necessary for plant running such as an operation setting screen of said instrument and an instrument parameter display screen, said drawing distortion unit deforms said deformation target region based on said deformation condition after changing a size in which said deformation target region can be displayed.

8. The plant information display device according to claim 1, wherein said region division unit divides said drawing into said deformation target region and said non-deformation target region such a facility symbol is not decoupled based on a positional relationship between a virtual line segment and another facility symbol, said virtual line segment being virtually produced by extending end points of two parallel line segments extracted from a minimum closed rectangular region including said facility symbol corresponding to said instrument of said interest region.

9. The plant information display device according to claim 1, wherein said region division unit specifies said instrument of said interest region, another instrument directly connected to said instrument, and piping connecting said instrument and said another instrument as a closed rectangular region, and said region division unit obtains a sum of sets of said closed rectangular regions to set the region of the sum of sets to said deformation target region.

10. The plant information display device according to claim 1, wherein said region determination unit specifies a range influenced by an instrument operation of said interest region based on topological information including information on logical connection between instruments extracted from said drawing.

* * * * *